United States Patent [19]

Hoyer et al.

[11] 4,323,497
[45] Apr. 6, 1982

[54] WATER-SOLUBLE DISAZO DYESTUFFS

[75] Inventors: Ernst Hoyer; Fritz Meininger, both of Frankfurt am Main; Rudolf Fass, Kelkheim, all of Fed. Rep. of Germany

[73] Assignee: Hoechst Aktiengesellschaft, Frankfurt am Main, Fed. Rep. of Germany

[21] Appl. No.: 956,322

[22] Filed: Oct. 31, 1978

[30] Foreign Application Priority Data

Nov. 2, 1977 [DE] Fed. Rep. of Germany ....... 2748975

[51] Int. Cl.$^3$ ..................... C09B 45/00; C09B 29/22
[52] U.S. Cl. .................................. 260/146 T; 260/153
[58] Field of Search ............................ 260/146 T, 153

[56] References Cited

U.S. PATENT DOCUMENTS

| | | | |
|---|---|---|---|
| 3,304,297 | 2/1967 | Wegmann | 260/153 |
| 3,591,577 | 7/1971 | Moiso et al. | 260/153 |
| 3,646,002 | 2/1972 | Andrew et al. | 260/146 T |
| 4,038,267 | 7/1977 | Sueda et al. | 260/153 |
| 4,054,559 | 10/1977 | Aoki et al. | 260/146 T |

*Primary Examiner*—Paul F. Shaver

*Attorney, Agent, or Firm*—Curtis, Morris & Safford

[57] ABSTRACT

The novel water-soluble disazo dyestuffs consist of two monoazo dyestuff moieties each containing as diazo component an amine of the benzene or naphthalene series and as coupling component an amino-naphthol-mono- or disulfonic acid. The two moieties are bonded to each other via a bridge member bound to the amino groups of the coupling components and comprising two triazine radicals each containing a halogen atom, a sulfonic acid group or a thio ether or oxygen ether group or an amino group and the diazo components contain a fiber-reactive radical of the vinyl sulfone series. The metal-free dyestuffs can be transformed into the corresponding heavy metal complex dyestuffs, preferably copper, cobalt and chromium complex dyestuffs, by treatment with an agent donating a heavy metal cation. The novel dyestuffs are excellently suitable for dyeing and printing fiber material of natural and regenerated cellulose and natural, regenerated and synthetic polyamides. They are distinguished by a high tinctorial strength, a very good uptake from a long liquor, a good color- build up and good printing properties. The dyeings obtained therewith have a high fastness to processing and in use.

16 Claims, No Drawings

WATER-SOLUBLE DISAZO DYESTUFFS

With the present invention, novel water-soluble dyestuffs of the general formula (1)

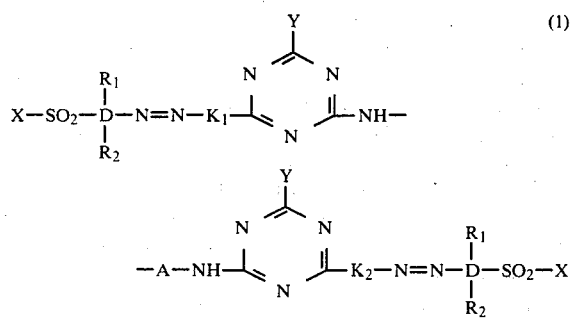

and their heavy metal complex compounds have been found.

The novel dyestuffs of the formula (1) can be in the form of the free acid or in the form of their salts. They are preferably in the form of the salts, especially the alkali metal and alkaline earth metal salts and in particular in the form of the sodium, potassium and calcium salts. They are preferably used in the form of the alkali metal salts for dyeing and printing fiber materials.

In the above formula (1), the various radicals in the formula have the following meaning: $K_1$ and $K_2$ are identical or different, preferably identical, and, described in the form of the free acid, represent a radical of the general formula

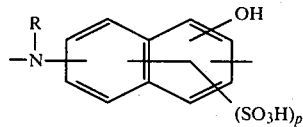

in which R denotes a hydrogen atom or a lower alkyl group, such as a methyl group, and p denotes the number 1 or 2, preferably one of the radicals of the formulae

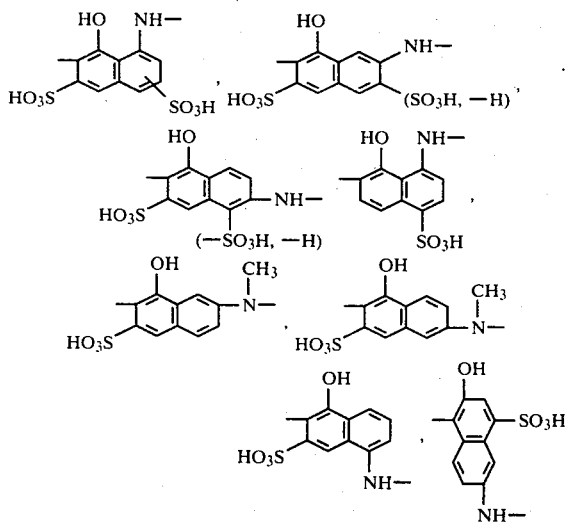

the above radicals $K_1$ and $K_2$ in the formula being bonded via the amino groups to the s-triazine radicals and in the ortho-position relative to the hydroxy groups to the azo groups; D is a benzene nucleus or naphthalene nucleus; $R_1$ is in the ortho-position relative to the azo group and denotes a hydrogen atom, a halogen atom, preferably a chlorine or bromine atom, a lower alkyl group, preferably a methyl group, a lower alkoxy group, preferably a methoxy group, a hydroxy or carboxy group or a sulfonic acid group and $R_2$ is a hydrogen atom, a halogen atom, preferably a chlorine or bromine atom, a lower alkyl group, preferably a methyl group, a lower alkoxy group, preferably a methoxy group, a nitro group or a sulfonic acid group, it being possible for $R_1$ and $R_2$ to be identical or different from one another; X represents the β-thiosulfatoethyl or β-chloroethyl group, preferably the β-sulfatoethyl or vinyl group; A is an aliphatic radical of 2-10 C atoms, especially an alkylene radical of 2-6 C atoms, or an aliphatic radical, especially an alkylene radical, of, in total, 2-6 C atoms, which can be interrupted by heteroatoms and/or cycloaliphatic radicals, for example by 1 or 2 such members from the group comprising —NH—, —O— and —N(CH$_3$)— and/or by a sulfur atom or a cyclohexylene group, or is a cycloaliphatic radical, such as, for example, a cyclohexylene radical, which can also be substituted by 1-3 methyl groups, or is a benzene nucleus or a naphthalene nucleus, which can also be substituted by substituents from the group comprising lower alkyl, such as, for example, methyl or ethyl, lower alkoxy, such as, for example, methoxy and ethoxy, chlorine, sulfo, carboxy and lower alkanoylamino, such as acetylamino, or is one of the radicals of the formulae

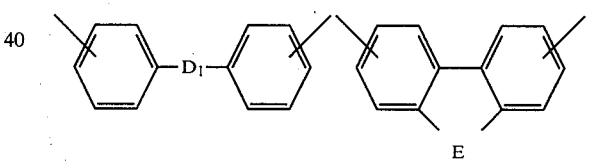

in which the benzene nuclei can be substituted by substituents, preferably 1 or 2 substituents, from the group comprising lower alkyl, such as methyl, lower alkoxy, such as methoxy, sulfo, carboxy and chlorine, and in which $D_1$ is a direct covalent bond or a bridge member, for example a bridge member of the formulae —CH$_2$—, —CH$_2$—CH$_2$—, —O—CH$_2$—CH$_2$—O—, —CH=CH—, —NH—, —O—, —S—, —SO$_2$—, —N=N—, —NH—CO—NH—, —CO—NH—, —NH—CO—,

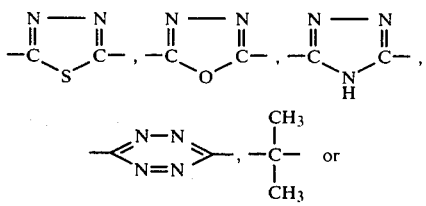

of a cyclohexylene radical, especially a radical of the formula

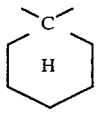

preferably a bridge member of the formula —CH$_2$—, —CH$_2$—CH$_2$—, —CH=CH—, —NH—, —SO$_2$—, —CO—NH— or —NH—CO— or the abovementioned bivalent radical of oxadiazole or preferably a direct covalent bond, and E represents a member of the formula —O—, —S—, —NH—, or —SO$_2$—; and Y is a chlorine, fluorine or bromine atom or a sulfonic acid group or a group which consists of a substituent bonded via a sulfur or oxygen atom and is of the formula —S—R' or —O—R", in which R' is preferably a substituent from the group comprising lower alkyl, substituted lower alkyl, phenyl, naphthyl, substituted phenyl, substituted naphthyl or 2-benzthiazolyl, such as, for example, lower alkyl substituted by substituents from the group comprising hydroxy, lower alkoxy, sulfato, sulfo, carboxy, phenyl, naphthyl, substituted phenyl and substituted naphthyl, or, for example, phenyl or naphthyl substituted by substituents from the group comprising nitro, sulfo and carboxy, and R" denotes a hydrogen atom or has the meaning of R' with the exception of 2-benzthiazolyl, or Y is an amino group of the formula —NR$_3$R$_4$, in which R$_3$ is a hydrogen atom, an optionally substituted lower aliphatic radical or an optionally substituted araliphatic radical or a cycloaliphatic radical, such as, for example, a lower alkyl radical which can be substituted by one or two substituents from the group comprising hydroxy, sulfato, lower alkoxy, sulfo, carboxy and phenyl, or is a cyclohexyl radical, and R$_4$ represents a hydrogen atom, an optionally substituted lower aliphatic radical, such as, for example, a lower alkyl radical which can be substituted by hydroxy, lower alkoxy, sulfato, sulfo and carboxy, or represents an optionally substituted aromatic radical, such as, for example, a phenyl or naphthyl radical, which can be substituted by one or two substituents from the group comprising hydroxy, carboxy, sulfo, lower alkyl and lower alkoxy, or represents an optionally substituted araliphatic radical, such as, for example, a lower alkyl radical which can be substituted by phenyl or naphthyl, or represents a hydroxy group or a lower alkoxy group or represents an optionally substituted amino group, such as, for example, the amino group or a phenylamino or lower alkylamino group, or in which R$_3$ and R$_4$ together with the nitrogen atom form a ring containing a lower alkylene radical and optionally a hetero-atom, such as, for example, a nitrogen atom or oxygen atom, such as, for example a morpholine, piperidine or piperazine ring.

The two radicals

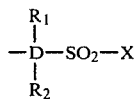

in the formula can be identical or different in the general formula (1); preferably they are identical.

Here and in the text which follows, the term "lower" used in the definitions denotes that the alkyl or alkylene radical contained in the group consists of 1-4 C atoms.

The present invention also relates to heavy metal complex dyestuffs of the abovementioned formula (1), in which one or both of the R$_1$s represents a hydroxyl group and bond the metal as a complex with the hydroxy groups of the coupling component or components. The heavy metal complex dyestuffs are preferably those in which two heavy metal equivalents are each bonded in complex form to one molecule of the formula (1), specifically in each case to the hydroxy groups R$_1$ and those of the aminonaphthol-disulfonic acid radicals. Preferred heavy metal complex dyestuffs are the copper, cobalt and chromium complex dyestuffs of the formula (1) according to the invention, especially the copper complex dyestuffs.

The present invention also relates to a process for the manufacture of the novel dyestuffs of the formula (1), which comprises reacting 2 moles of the diazonium compound of one or two aromatic amines, preferably a single aromatic amine of the general formula (2)

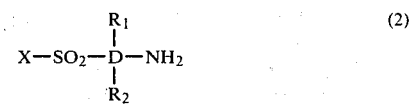

in which D, R$_1$, R$_2$ and X are as defined above and R$_1$ is in the ortho-position relative to the amino group, with 1 mole of a coupling component of the general formula (3)

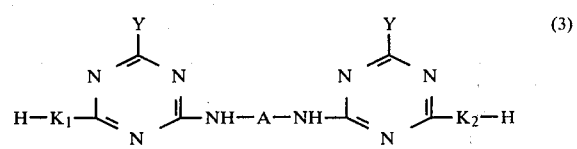

in which A, K$_1$, K$_2$ and Y are as defined above.

The present invention also relates to a process for the manufacture of the heavy metal complex dyestuffs of the abovementioned general formula (1), which comprises reacting the metal-free dyestuffs of the formula (1) in which R$_1$ represents a hydrogen atom or a hydroxy or lower alkoxy group, if desired immediately following the abovementioned procedure, according to the invention, for the manufacture of the metal-free dyestuffs of the formula (1), in a manner which is in itself known, if appropriate in the presence of an oxidizing agent, with a metal donor.

The metal-free dyestuffs of the formula (1) or their heavy metal complexes can, however, also be manufactured in a manner according to the invention by subjecting one mole of each of the monoazo compounds of the general formulae (4) and (5)

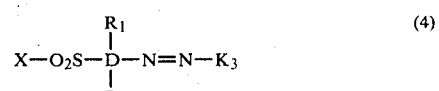

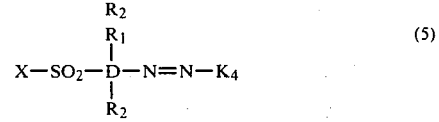

described in the form of the free acids, in which R$_1$, R$_2$, D and X are as defined above and K$_3$ and K$_4$ are identical or different, preferably identical, and represent a radical of the general formula

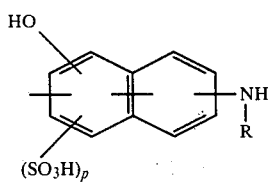

in which R and p are as defined above, and preferably represent one of the radicals of the formulae

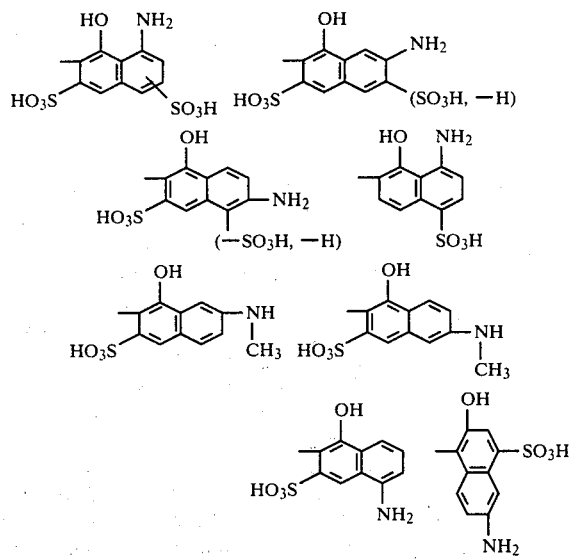

the azo group being bonded to the radicals $K_3$ and $K_4$ in formulae 4 and 5 in each case in the ortho-position relative to the hydroxy group of the naphthol radical, or two moles of their heavy metal complex compounds in which $R_1$ is a hydroxy group, preferably the 1:1 copper complex compounds, or 1 mole of the heavy metal complex compound of the formula (4) or (5) and 1 mole of the metal-free compound of the formula (5) or, respectively, (4) to a condensation reaction with a halogeno-s-triazine compound of the formula (6)

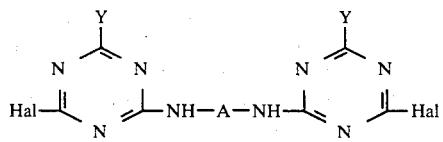

in which A and Y are as defined above and Hal represents a chlorine, bromine or fluorine atom, and, if desired, subsequently reacting the product in a manner which is in itself known, if appropriate in the presence of an oxidizing agent, with an agent which donates a heavy metal cation.

The novel metal-free or metal-containing dyestuffs of the formula (1) in which $K_1$ and $K_2$ are identical can also be manufactured in a manner according to the invention by subjecting 2 moles of a monoazo compound of the formula (7)

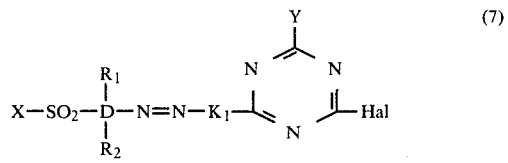

in which D, $R_1$, $R_2$, X, Y and Hal are as defined above and $K_1$ represents one of the abovementioned radicals, which is identical to $K_2$, to a condensation reaction with one mole of a compound of the formula (8)

in which A is as defined above, and, if desired, reacting the metal-free dyestuff of the formula (1), thus obtained, in a manner which is in itself known, if appropriate in the presence of an oxidizing agent, with a metal donor.

The abovementioned condensation reactions are preferably carried out in aqueous solution, optionally in the presence of organic solvents, at room temperature (15°–25° C.) or elevated temperature (up to 120° C.) in accordance with known processes in an analogous manner well known to those skilled in the art. If the heavy metal complex dyestuffs according to the invention are manufactured by subsequent metallization, as indicated here, one or both of the $R_1$s can be a hydrogen atom, a hydroxy group or a lower alkoxy group.

It is also possible, in a manner according to the invention, to convert a heavy metal complex dyestuff according to formula (1) into a heavy metal dyestuff according to the invention which contains a different heavy metal central atom, by splitting the original heavy metal atom from the complex dyestuff analogously to the known methods (see, for example, Angew. Chem. 64, 397 (1952)) and reacting the resulting o,o'-dihydroxy-azo dyestuff with an agent which supplies the other heavy metal atom. Thus, for example, copper complex dyestuffs of the formula (1) can be converted to the corresponding chromium or cobalt complex dyestuffs of the formula (1).

Preferred dyestuffs, according to the invention, of the formula (1) and their heavy metal complexes are those in which D represents a benzene nucleus and also those in which D represents a naphthalene nucleus in which the azo group is bonded in the β-position of this naphthalene nucleus. Further preferred dyestuffs according to the invention are those in which Y denotes a halogen atom, preferably a chlorine atom. Furthermore, dyestuffs of particular importance are those in which $K_1$ and $K_2$, which can be identical or different, represent the abovementioned divalent radical of 1-amino-naphthol(8)-3,6-disulfonic acid, 1-aminonaphthol(8)-4,6-disulfonic acid, 2-amino-naphthol(8)-6-sulfonic acid or 2-amino-naphthol(5)-7-sulfonic acid.

In addition to the said halogen atoms and the sulfonic acid group, the following individual groups are to be singled out for the substituent Y in the triazine ring of the dyestuffs of the formula (1) or of the compounds of the formulae (3), (6) and (7):

—O—CH₃, —O—C₂H₅, —O—CH₂—CH₂—CH₃, —OH,

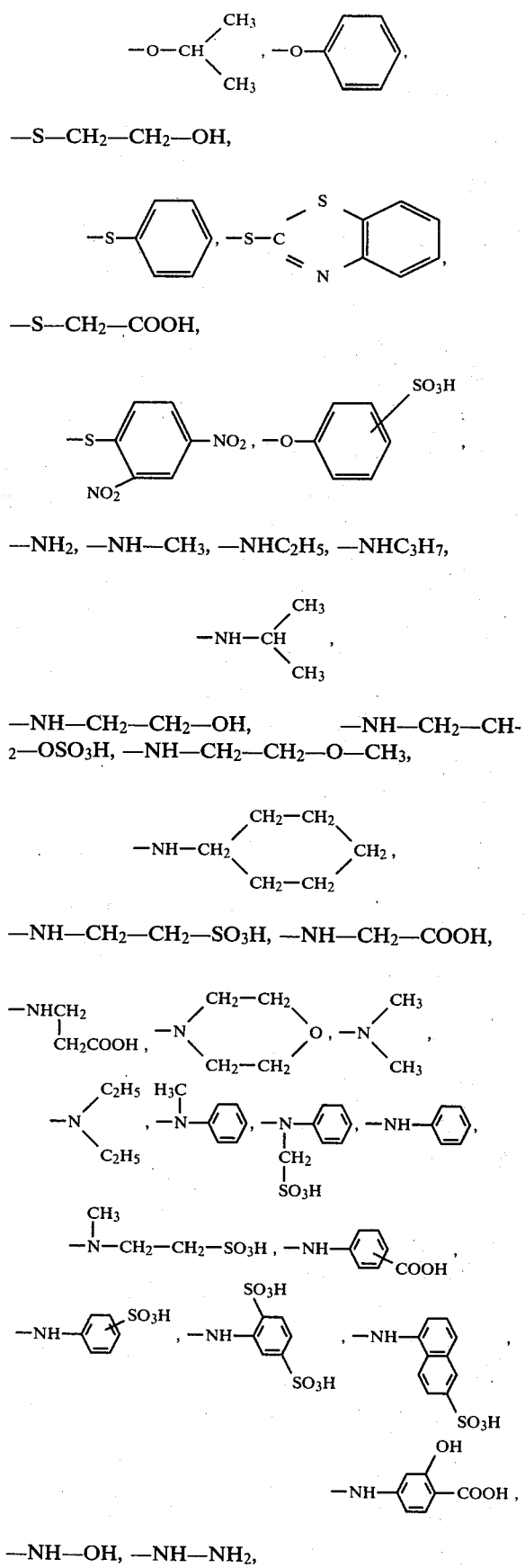

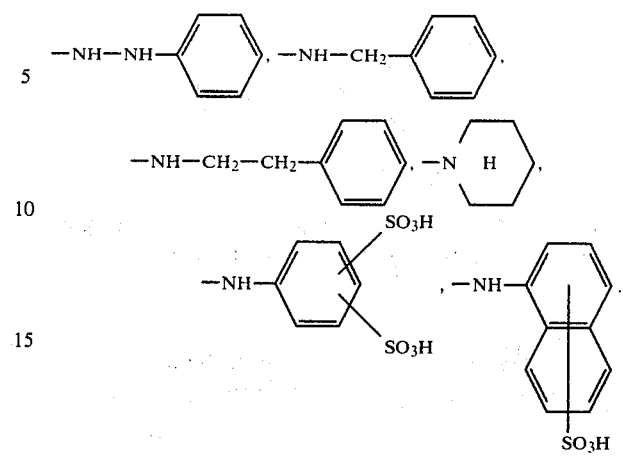

Preferably, the radical Y in the formula denotes a chlorine, bromine or fluorine atom or a sulfo, amino, methylamino, dimethylamino, β-hydroxyethyl-amino, β-methoxyethyl-amino, β-sulfatoethyl-amino, β-sulfoethyl-amino, N-methyl-N-β-sulfoethyl-amino, carboxymethyl-amino, N-β-carboxyethyl-amino, N-(carboxyphenyl)-amino, N-(sulfophenyl)-amino, N-(disulfophenyl)-amino, N-(sulfonaphthyl(1))-amino, N-methylanilino, morpholino, iso-propoxy, phenoxy or β-hydroxyethylthioether group.

Further compounds of the formula (1) which should be mentioned as being preferred are those in which D is a benzene nucleus and $R_1$, $R_2$, A, $K_1$, $K_2$, Y and X have one of the abovementioned meanings, especially the preferred meanings, and also compounds of the formula (1) in which D denotes a naphthalene nucleus which is bonded in the 2-position to the azo group, $R_1$ represents a hydrogen atom and $R_2$ represents the sulfo group in the 6-position of the naphthalene nucleus, or $R_1$ denotes the sulfo group and $R_2$ is hydrogen, and $K_1$, $K_2$, A, Y and X have one of the abovementioned meanings, especially the preferred meanings.

Further preferred compounds of the formula (1) are those in which D represents a benzene nucleus, in which the group —$SO_2$—X is in the meta-position or para-position relative to the azo group, or in which D denotes a naphthalene nucleus which is bonded in the 2-position to the azo group and which contains the group —$SO_2$—X in the 6-position or 8-position, and A, $R_1$, $R_2$, $K_1$, $K_2$, Y and X have one of the abovementioned meanings, especially the preferred meanings.

Further compounds to be singled out are those in which A represents a radical of the formula

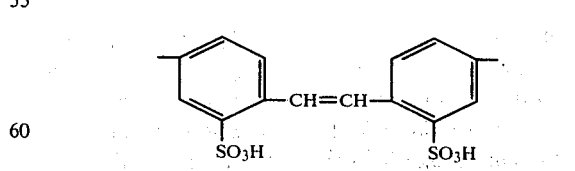

Further preferred compounds of the formula (1) to be mentioned are those in which D, $R_1$, $R_2$ and A have one of the abovementioned meanings, especially the preferred meanings, X represents the β-sulfatoethyl radical and Y represents a chlorine atom and $K_1$ denotes a radical of the formula

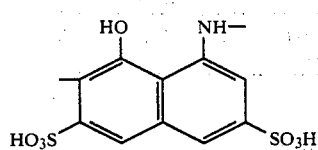

and K₂ denotes a radical of the formula

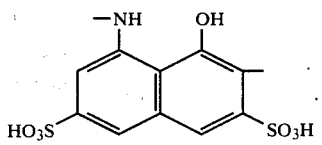

Amongst these compounds, compounds in which D is a benzene nucleus, $R_1$ and $R_2$ are each hydrogen, and the β-sulfatoethylsulfonyl group is in the p-position relative to the azo group, are particularly preferred.

The aromatic amines of the formula (2) are known, for example from German Patent Specifications 1,278,041, 1,276,842, 1,150,163, 1,126,542 and 1,153,029, from German Offenlegungsschriften 2,154,943, 2,100,080, 2,049,664, 2,142,728, 2,034,591 and 1,943,904 or from German Auslegeschrift 1,204,666.

Aromatic amines of the formula (2) which may be mentioned are, in particular, the following compounds: aniline-3-β-sulfatoethylsulfone, aniline-4-β-sulfatoethylsulfone, 2-amino-toluene-4-β-sulfatoethylsulfone, 2-amino-anisole-4-β-sulfatoethylsulfone, 2-amino-anisole-5-β-sulfatoethylsulfone, 2-amino-4-β-sulfatoethylsulfonyl-benzoic acid, 2-methoxy-5-methyl-aniline-4-β-sulfatoethylsulfone, 2,5-dimethoxy-aniline-4-β-sulfatoethylsulfone, 2,4-dimethoxy-aniline-5-β-sulfatoethylsulfone, 4-aminoanisole-2-β-sulfatoethylsulfone, 4-aminotoluene-2-β-sulfatoethylsulfone, 4-β-sulfatoethylsulfonyl-aniline-2-sulfonic acid, 5-β-sulfatoethylsulfonyl-aniline-2-sulfonic acid, 2-chloroaniline-4-β-sulfatoethylsulfone, 2-chloroaniline-5-β-sulfatoethylsulfone, 2-bromoaniline-4-β-sulfatoethylsulfone, 2,6-dichloroaniline-4-β-sulfatoethylsulfone, 2,6-dimethyl-aniline-4-β-sulfatoethylsulfone, 2,6-dimethyl-aniline-3-β-sulfatoethylsulfone, 2-amino-phenol-4-β-sulfatoethylsulfone, 2-amino-phenol-5-β-sulfatoethylsulfone, 6-bromo-2-amino-phenol-4-β-sulfatoethylsulfone, 6-chloro-2-amino-phenol-4-β-sulfatoethylsulfone, 6-nitro-2-amino-phenol-4-β-sulfatoethylsulfone, 4-methyl-2-amino-phenol-5-β-sulfatoethylsulfone, 2-naphthylamine-5-β-sulfatoethylsulfone, 2-naphthylamine-8-β-sulfatoethylsulfone, 8-β-sulfatoethylsulfonyl-2-amino-naphthalene-6-sulfonic acid, 6-β-sulfatoethylsulfonyl-2-amino-naphthalene-1-sulfonic acid, 2-naphthylamine-6-β-sulfatoethylsulfone and the corresponding vinylsulfonyl, β-thiosulfatoethylsulfonyl and β-chloroethylsulfonyl compounds.

The coupling components of the formula (3) can, for example, easily be prepared in a manner which is analogous to the procedures described in German Patent Specification 485,185 and which is well-known to those skilled in the art. Coupling components of the formula (3) which may be mentioned are, in particular, the compounds of the formula (3) which are listed in the following table and in which A and Y have one of the above-mentioned meanings:

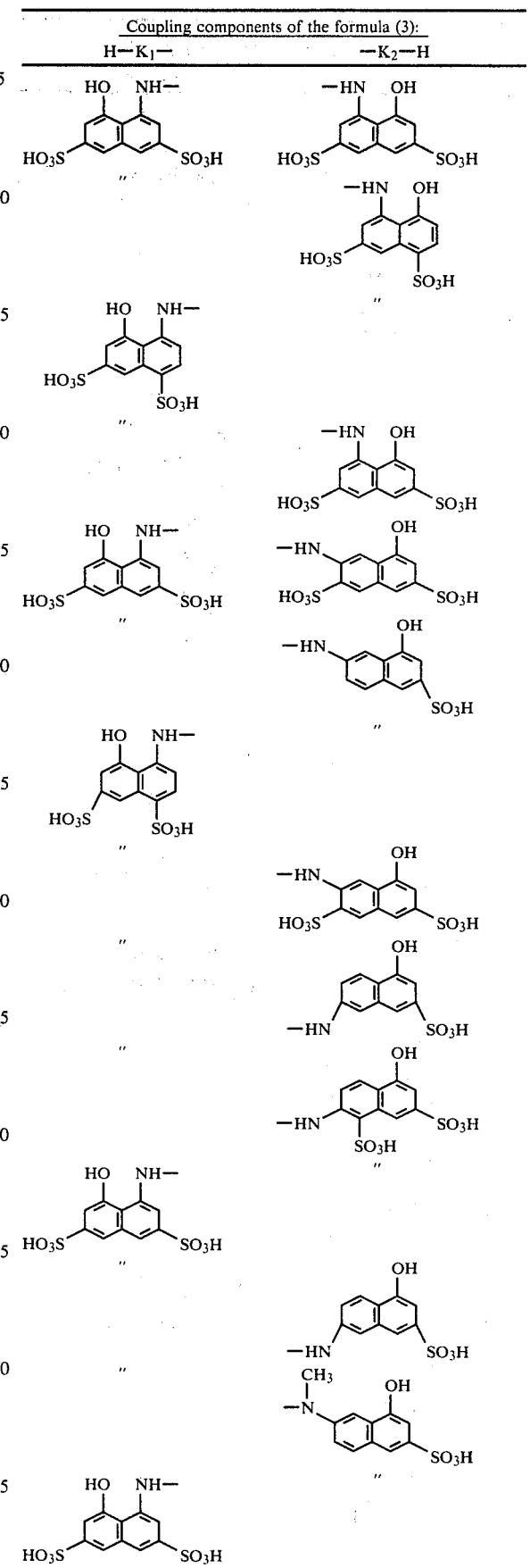

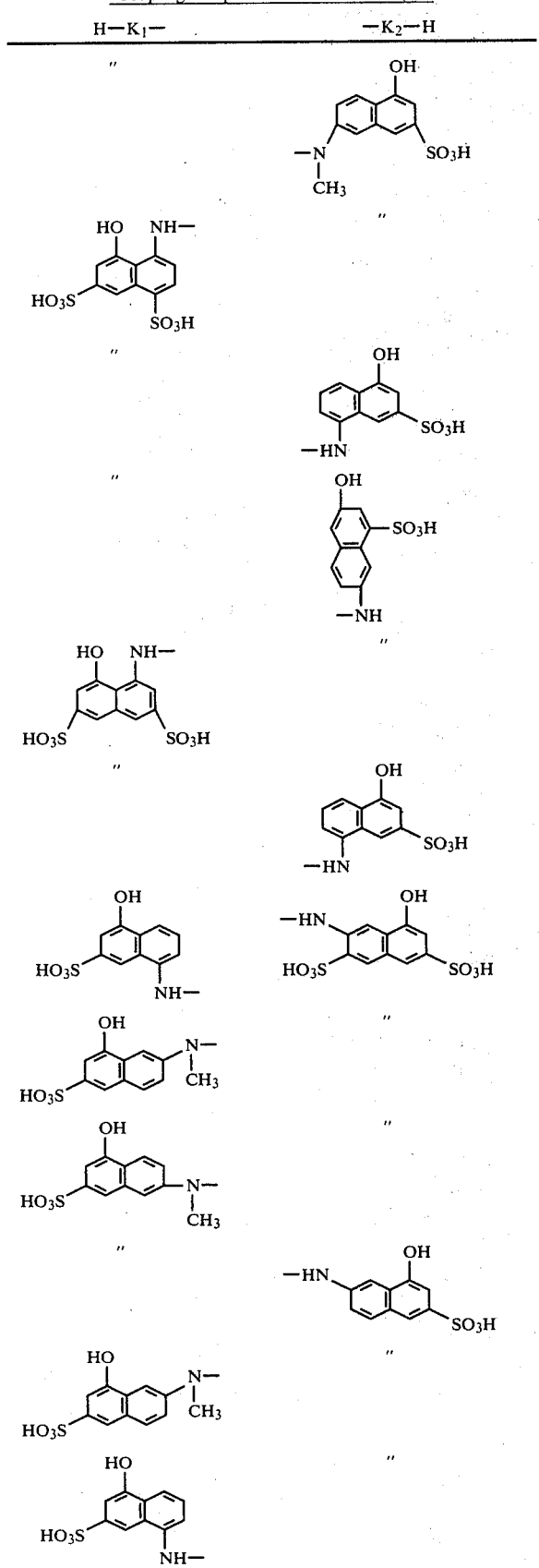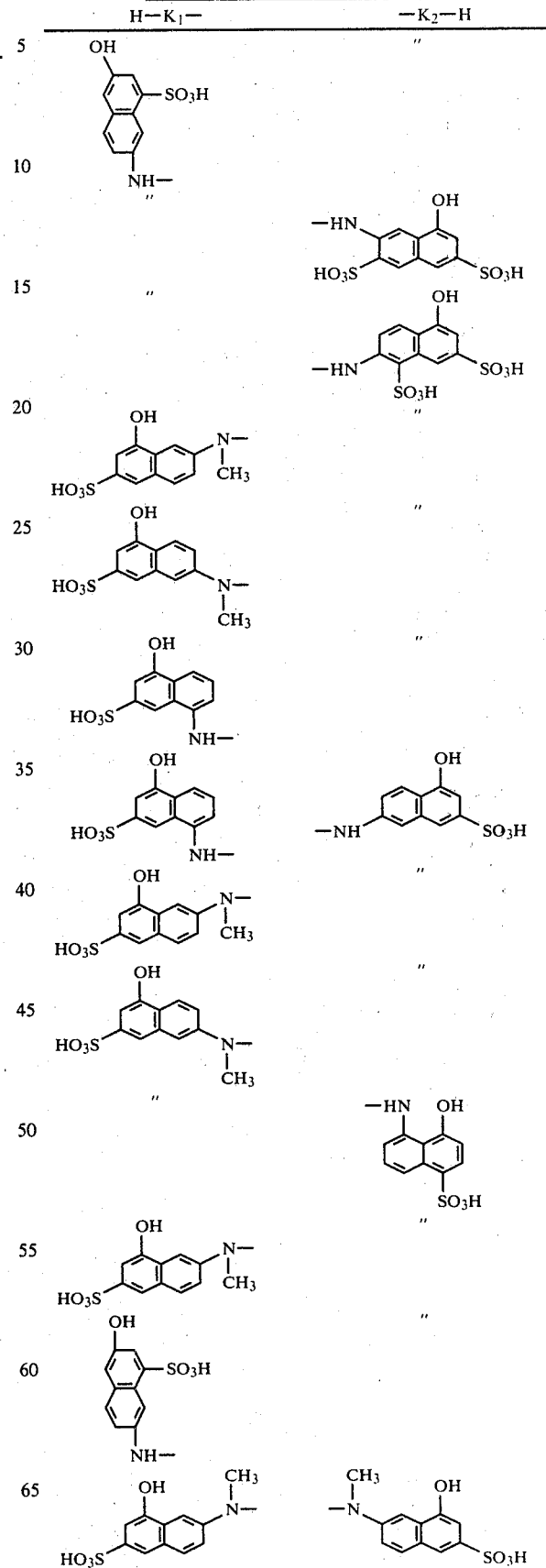

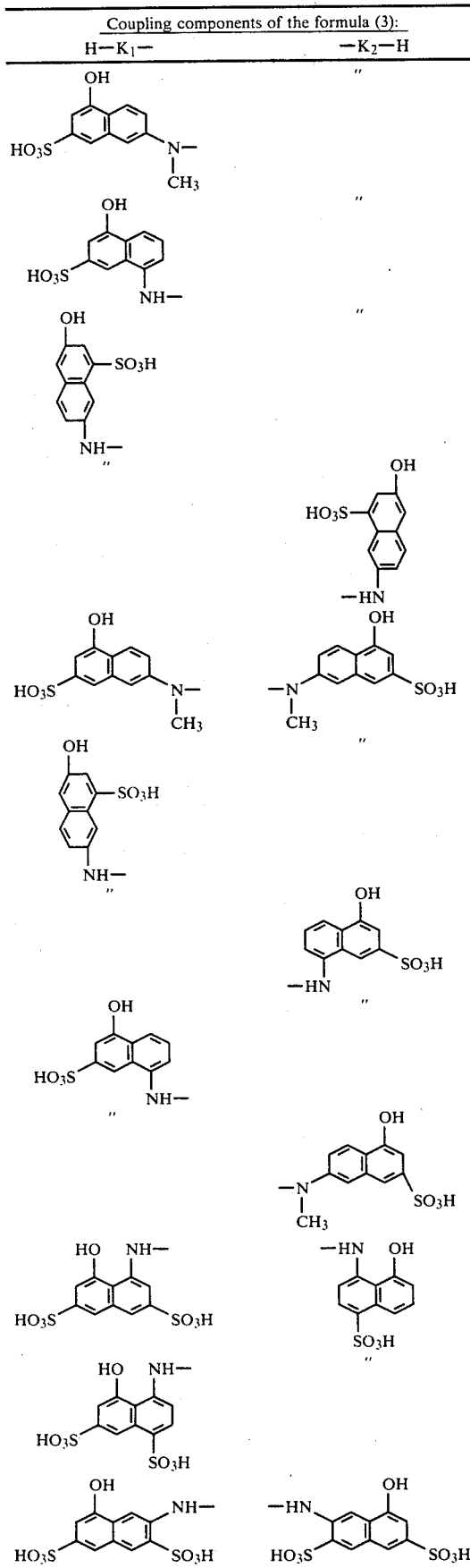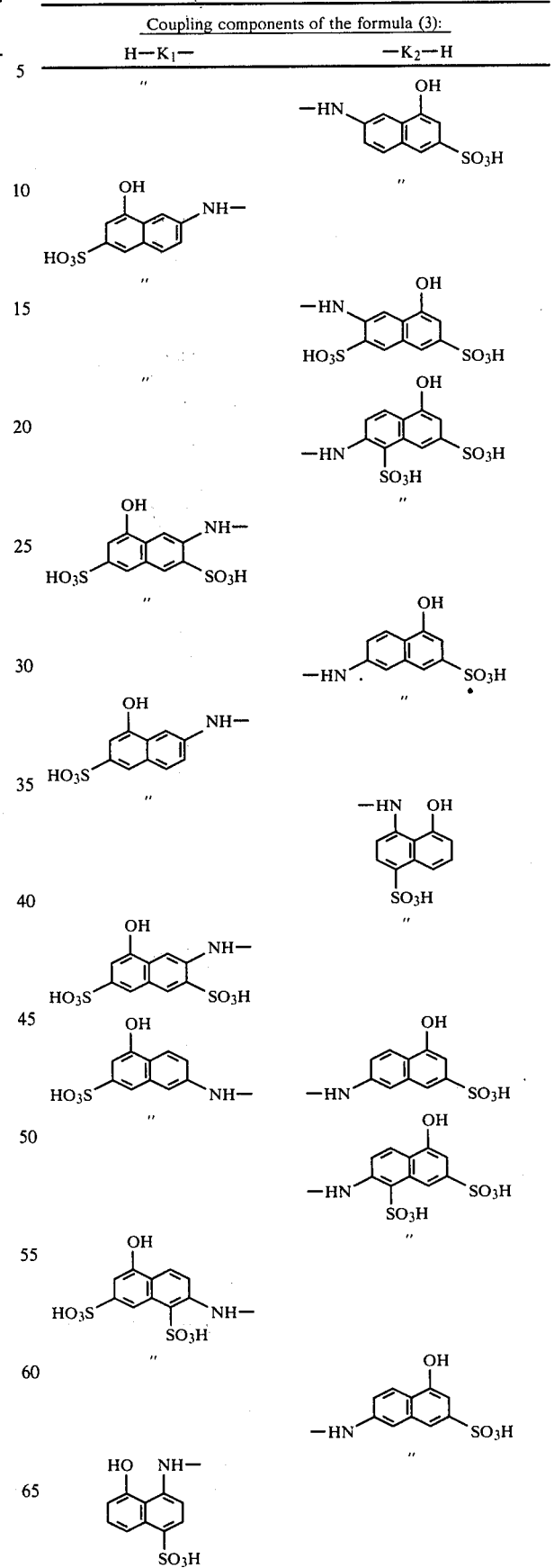

-continued

| Coupling components of the formula (3): | |
|---|---|
| H—K₁— | —K₂—H |
| " | 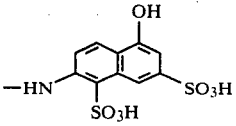 |
| " | 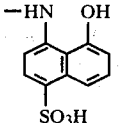 |

The diazotization of the aromatic amines of the formula (2) is carried out by generally known methods. However, care must be taken that these aromatic amines, and the diazonium salts obtained therefrom, are not subjected to strongly alkaline conditions during processing.

The coupling of the diazotized amines with the coupling components of the formula (3) is preferably carried out in a pH range between 3 and 7, at temperatures between −5° and +30° C.

If a hydroxy group is present in the o-position relative to the azo bridges in the radicals of the diazo components, that is to say if $R_1$=OH, the dyestuffs are converted to the heavy metal complex dyestuffs by adding a heavy metal donor to the dyestuff solution or the dyestuff suspension, if necessary with an acid-binding agent and if necessary by treatment at elevated temperature (in general the reaction can be carried out at 0°–120° C.) until the conversion to the desired heavy metal complex dyestuff is complete.

Examples of heavy metal donors which can be used are: copper salts, such as copper sulfate, copper chloride, copper acetate or copper carbonate, chromium salts, such as chromium formate, chromium acetate, chromium sulfate, potash/chrome alum or chromium/-salicylic acid, or cobalt salts, such as cobalt sulfate, cobalt chloride or a cobalt/tartaric acid complex.

Acid-binding agents used when converting the dyestuffs to the heavy metal complex dyestuffs are preferably alkali metal salts of weak inorganic or organic acids, such as sodium carbonate, sodium bicarbonate or sodium acetate.

If $R_1$ is an alkoxy group, preferably a methoxy group, this can be converted by known methods, during the reaction to convert the dyestuff to the heavy metal complex dyestuff, preferably the copper complex dyestuff, to a hydroxy group and the latter can participate in the formation of the complex.

If $R_1$ is a hydrogen atom, this can be replaced by a hydroxy group under the conditions of oxidative coppering [Angew. Chem. 70, 232–238 (1958)], with simultaneous incorporation of the said hydroxy group into the complex compound. The oxidizing agents used are advantageously derivatives of hydrogen peroxide, such as sodium peroxide, salts of peroxysulfuric acid or salts of perboric acid, but preferably hydrogen peroxide itself. Advantageous reaction conditions in general lie at 20°–100° C. and at pH values between 7 and 3.

The resulting dyestuffs of the formula (1) or their heavy metal complex compounds are separated off by generally known methods, either by precipitating from the reaction medium by means of electrolytes, such as, for example, sodium chloride or potassium chloride, or by evaporating the reaction solution, for example by spray-drying. If the latter method of isolating the dyestuff is chosen, it is advisable, before evaporating, to remove any amounts of sulfate which may be present in the solutions by precipitating these as gypsum and separating them off by filtration. In some cases, it can also be desirable to supply the dyestuff solution direct, if appropriate after adding buffer substances, as a liquid preparation for use in dyeing.

The present invention also relates to the dyeing and printing of cellulose and polyamide fiber materials with the dyestuffs according to the invention.

Cellulose fiber materials are understood as meaning preferably cotton and regenerated cellulose, but also other vegetable fibers, such as linen, hemp and jute. Polyamide fibers are to be understood as meaning both those of natural origin and those of synthetic origin, that is to say both wool and other animal hairs and silk and also polyamide 6,6, polyamide 6, polyamide 11 or polyamide 4.

The dyestuffs according to the invention can be applied to the said substrates by the application techniques known for reactive dyestuffs.

Thus, with these dyestuffs very good color yields are obtained on cellulose fibers by the exhaustion method from a long liquor, using very diverse alkali additives.

Excellent color yields are also obtained on cellulose fibers by the pad method, and the dyes can be fixed by a residence time at room temperature, by steaming or with dry heat.

Intense prints with outlines in a good state and a clear white ground are also obtained by the conventional printing processes for cellulose fibers—in a single phase in the presence of sodium bicarbonate or other acid-binding agents in the printing paste with subsequent steaming at 101°–103° C. or in two phases, printing with a neutral or weakly acid printing paste and then either passing through a hot electrolyte-containing alkaline bath or over-padding with an alkaline electrolyte-containing padding liquor and then developing by means of a residence time, steaming or dry heat. The appearance of the prints is only slightly dependent on changing fixing conditions. Both in dyeing and in printing, the degrees of fixation obtained with the dyestuffs according to the invention are exceptionally high.

With regard to the coloristic properties of the dyestuffs according to the invention, it must be emphasized in particular that these dyestuffs are distinguished by good stability in printing pastes and padding liquors, including in the presence of alkali, by a very good uptake from a long liquor, by good color build-up by the conventional dyeing and printing processes, by an identical depth of shade when dyeing on cotton and regenerated cellulose fibers, by levelness of the dyeings and prints produced therewith and also by a uniform appearance of the dyeings from a long liquor on the addition of various amounts of electrolytes, such as sodium sulfate or sodium chloride.

The fastness properties of the dyeings and prints obtained with the aid of the dyestuffs according to the invention, especially those on cellulose fibers, are appreciable. This equally applies in the case of the most important fastnesses to manufacturing processes and fastness properties in use. The fastness to light, the fastness to wet processing, such as fastness to washing, fastness to milling, fastness to water and fastness to seawater, and the fastness to ironing and fastness to rubbing should be mentioned in particular.

The dyeings on polyamide fibers are usually carried out from an acid medium. Thus, for example, acetic acid or acetic acid and ammonium acetate can be added to the dyebath in order to obtain the desired pH value. In order to obtain a usable levelness of the dyeings, it is advisable to add conventional levelling agents, for example those based on a reaction product of cyanuric chloride with three times the molar amount of an aminobenzenesulfonic acid and/or of an aminonaphthalenesulfonic acid and/or those based on a reaction product of, for example, stearylamine with ethylene oxide. The dyeings can be carried out either at the boil or at 110° to 120° C.

The examples which follow serve to illustrate the invention. The relationship between parts by weight and parts by volume is the same as that between kilogram and liter. The percentages are by weight unless stated otherwise.

sodium nitrite solution are then added and the solution thus obtained is allowed to run into a mixture of 25 parts by volume of aqueous 31% hydrochloric acid and 150 parts by weight of ice. The mixture is stirred for 1 hour at 0°–5° C., excess nitrous acid is then destroyed with a little amidosulfonic acid and the pH is then adjusted to 5.5–6.0 with 4 parts by weight of sodium bicarbonate. The reaction mixture described initially is added to this diazonium salt solution and the coupling reaction is carried out at 10°–12° C. and pH 5.5–6.0 for 15 hours. The coupling mixture is then warmed to 60° C. and, after adding 5 parts by weight of kieselguhr, is clarified. The dyestuff is precipitated from the filtrate by introducing 25%-based on the volume—of sodium chloride and is filtered off, dried in vacuo at 60° C. and ground.

This gives 253 parts by weight of a brown dyestuff powder, with which red dyeings of good general fastness properties can be produced on cellulose materials in the presence of alkaline agents.

The dyestuff has the following constitution:

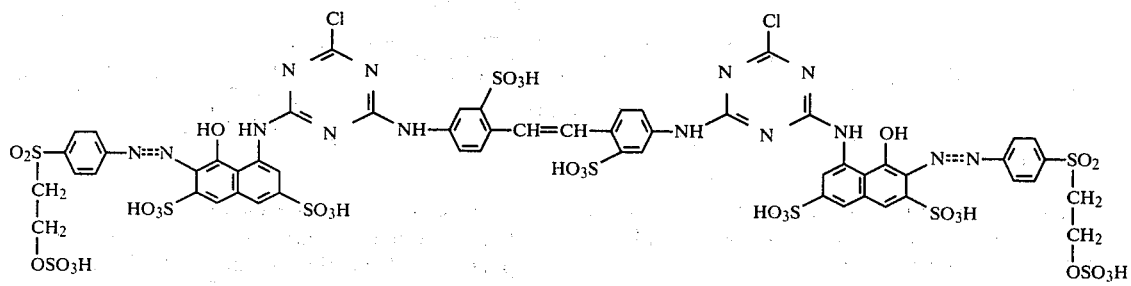

EXAMPLE 1

(a) 18.5 parts by weight of cyanuric chloride are dissolved in 60 parts by volume of acetone and the solution is then allowed to run into 500 parts by volume of cold water, with stirring. A solution of 31.9 parts by weight of 1-amino-8-naphthol-3,6-disulfonic acid in 150 parts by volume of water, which has been neutralized with 12 parts by weight of aqueous 33% sodium hydroxide solution, is added immediately to the suspension thus obtained and the resulting mixture is stirred for 15 minutes. A neutral solution of 20.7 parts by weight of the disodium salt of 4,4'-diaminostilbene-2,2'-disulfonic acid in 250 parts by volume of water is then added, immediately thereafter 30 parts by weight of crystalline sodium acetate are introduced and the mixture is then stirred for several hours. The diazonium salt solution obtained in the following way is then added to the reaction mixture thus obtained:

28.1 parts by weight of aniline-4-β-sulfatoethylsulfone are dissolved in 140 parts by volume of water and 60 parts by weight of ice with the addition of about 6.5 parts by weight of calcined sodium carbonate to give a neutral solution, 20.5 parts by volume of aqueous 5 N (b) The dyestuff with virtually the same properties can be obtained when 2 moles of the dyestuff of the formula

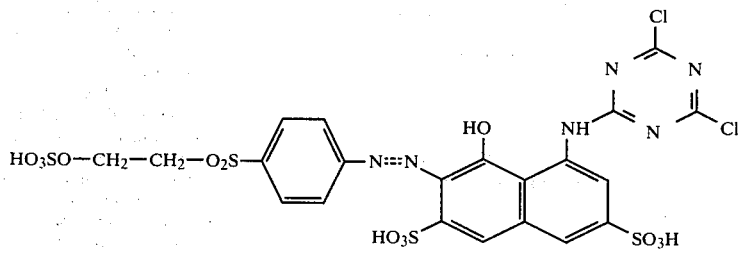

described in Japanese Published Patent Sho 38-23,287, are reacted with one mole of 4,4'-diaminostilbene-2,2'-disulfonic acid at a somewhat higher temperature and a pH of 6.5–7.0 in an aqueous medium.

(c) Furthermore, the dyestuff can be prepared when 2 moles of the aminoazo dyestuff of the formula

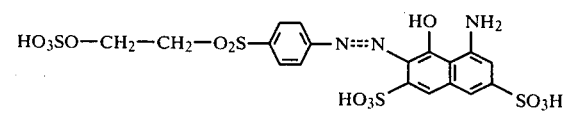

which can be obtained by coupling diazotized aniline-4-β-hydroxyethylsulfone with 1-acetylamino-8-naphthol-3,6-disulfonic acid, saponifying the acetylamino group to the free amino group and esterifying the β-hydroxyethylsulfonyl group by means of an excess of 100% strength sulfuric acid to the β-sulfatoethylsulfonyl group, are reacted with 1 mole of the compound of the formula

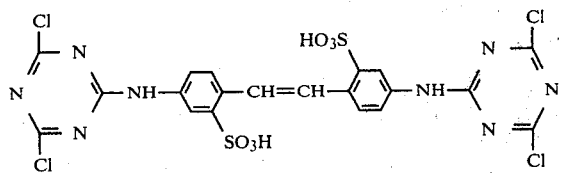

which can be prepared in a known manner by reacting a solution of 1 mole of the disodium salt of 4,4'-diaminostilbene-2,2'-disulfonic acid in approximately 15 times the amount by weight of water with a solution of 2 moles of cyanuric chloride in acetone at 0° C., with the addition of a solution of barely 2 moles of sodium carbonate in 5 times the amount by weight of water, in an aqueous medium at elevated temperature, a pH value of 6.9–7.2 being maintained.

EXAMPLE 2

If a neutral solution of 22.4 parts by weight of the disodium salt of 4,4'-diamino-3,3'-dimethoxy-diphenyl-6,6'-disulfonic acid in 300 parts by volume of water is employed in place of the solution of 20.7 parts by weight of the disodium salt of 4,4'-diaminostilbene-2,2'-disulfonic acid in Example 1 and in other respects the procedure is as described in Example 1, this gives, when the dyestuff is precipitated with 20%, based on the volume, of potassium chloride, filtered off, dried in vacuo at 60° C. and ground, 169 parts by weight of a brown powder with which red dyeings and prints of good general fastness properties can be produced on cellulose materials in the presence of acid-binding agents.

The dyestuff has the following constitution:

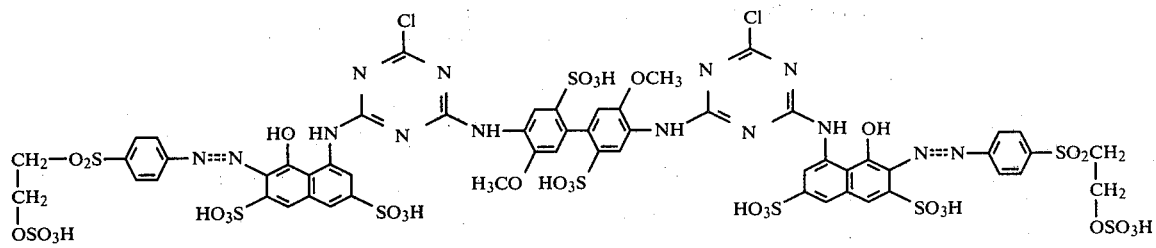

Dyestuffs can be obtained in a manner analogous to that described in Examples 1 and 2 from the diazo components and coupling components listed in the table which follows; these dyestuffs dye and print cotton in the indicated color shades.

TABLE 1

| Example No. | Diazo component | Coupling component | Color shade on cotton |
|---|---|---|---|
| 3 | 2 moles of aniline-3-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | red |
| 4 | 2 moles of 2-aminoanisole-5-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | claret |
| 5 | 2 moles of 2-aminoanisole-4-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | claret |
| 6 | 2 moles of 2-aminotoluene-4-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | red |
| 7 | 2 moles of 2-methoxy-5-methyl-aniline-4-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | claret |
| 8 | 2 moles of 2,5-dimethoxy-aniline-4-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | claret |
| 9 | 2 moles of 2-chloroaniline-5-β-sulfatoethylsulfone | condensation product of 2 moles of the primary condensation product obtained | red |

TABLE 1-continued

| Example No. | Diazo component | Coupling component | Color shade on cotton |
|---|---|---|---|
| 10 | 2 moles of 2,6-dimethylaniline-4-β-sulfatoethylsulfone | from cyanuric chloride and 1-amino-8-naphthol-3,6-disulfonic acid in an equimolar ratio with 1 mole of 4,4'-diaminostilbene-2,2'-disulfonic acid condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | red |
| 11 | 2 moles of 2,6-dimethylaniline-3-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | red |
| 12 | 2 moles of 2,4-dimethoxyaniline-5-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | bluish-tinged red |
| 13 | 2 moles of 2-aminoanisole-4-β-thiosulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | claret |
| 14 | 2 moles of aniline-4-β-thiosulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | red |
| 15 | 2 moles of 4-aminoanisole-2-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | claret |
| 16 | 2 moles of 4-β-sulfatoethylsulfonylaniline-2-sulfonic acid | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | red |
| 17 | 2 moles of 4-aminotoluene-2-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | red |
| 18 | 2 moles of 2-aminoanisole-4-vinylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | claret |
| 19 | 2 moles of aniline-4-vinylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | red |
| 20 | 2 moles of aniline-3-vinylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | red |
| 21 | 2 moles of 2-bromoaniline-4-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | red |
| 22 | 2 moles of 2,6-dichloroaniline-4-β-sulfatoethylsulfone | condensation product of 2 moles of the primary condensation product obtained from cyanuric chloride and 1-amino-8-naphthol-3,6-disulfonic acid in an | red |

TABLE 1-continued

| Example No. | Diazo component | Coupling component | Color shade on cotton |
|---|---|---|---|
| 23 | 2 moles of 6-β-sulfatoethyl-sulfonyl-2-aminonaphthalene-1-sulfonic acid | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | bluish-tinged red |
| 24 | 2 moles of 2-naphthylamine-5-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | red |
| 25 | 2 moles of 2-naphthylamine-8-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | bluish-tinged red |
| 26 | 2 moles of 2-naphthylamine-6-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | bluish-tinged red |
| 27 | 2 moles of 2-chloroaniline-4-β-sulfatoethylsulfone | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | red |
| 28 | 2 moles of 2-amino-4-β-sulfatoethylsulfonyl-benzoic acid | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | red |
| 29 | 2 moles of 5-β-sulfatoethyl-sulfonylaniline-2-sulfonic acid | condensation product of 2 moles of the primary condensation product obtained from cyanuric chloride and 1-amino-8-naphthol-3,6-disulfonic acid in an equimolar ratio with 1 mole of 4,4'-diaminostilbene-2,2'-disulfonic acid | red |
| 30 | 2 moles of aniline-4-β-sulfatoethylsulfone | condensation product of 2 moles of the primary condensation product obtained from equimolar amounts of cyanuric chloride and 1-amino-8-naphthol-4,6-disulfonic acid with 1 mole of 4,4'-diaminostilbene-2,2'-disulfonic acid | red |
| 31 | 2 moles of aniline-3-β-sulfatoethylsulfone | condensation product of 2 moles of the primary condensation product obtained from equimolar amounts of cyanuric chloride and 1-amino-8-naphthol-4,6-disulfonic acid with 1 mole of 4,4'-diaminostilbene-2,2'-disulfonic acid | red |
| 32 | 2 moles of aniline-4-β-thiosulfatoethylsulfone | condensation product of 2 moles of the primary condensation product obtained from equimolar amounts of cyanuric chloride and 1-amino-8-naphthol-4,6-disulfonic acid with 1 mole of 4,4'-diaminostilbene-2,2'-disulfonic acid | red |
| 33 | 2 moles of aniline-4-vinyl-sulfone | condensation product of 2 moles of the primary condensation product obtained from equimolar amounts of cyanuric chloride and 1-amino-8-naphthol-4,6-disulfonic acid with 1 mole of 4,4'-diaminostilbene-2,2'-disulfonic acid | red |
| 34 | 2 moles of 2-aminoanisole-4-β-sulfatoethylsulfone | condensation product of 2 moles of the primary condensation product obtained from equimolar amounts of cyanuric chloride and 1-amino-8-naphthol-4,6-disulfonic acid with 1 mole of 4,4'-diaminostilbene-2,2'-disulfonic acid | claret |
| 35 | 2 moles of 2-methoxy-5-methyl-aniline-4-β-sulfatoethyl-sulfone | condensation product of 2 moles of the primary condensation product obtained from equimolar amounts of cyanuric chloride and 1-amino-8-naphthol-4,6-disulfonic acid with 1 mole of 4,4'-diaminostilbene-2,2'-disulfonic acid | claret |

TABLE 1-continued

| Example No. | Diazo component | Coupling component | Color shade on cotton |
|---|---|---|---|
| 36 | 2 moles of 2,5-dimethoxy-aniline-4-β-sulfatoethyl-sulfone | condensation product of 2 moles of the primary condensation product obtained from equimolar amounts of cyanuric chloride and 1-amino-8-naphthol-4,6-disulfonic acid with 1 mole of 4,4'-diaminostilbene-2,2'-disulfonic acid | claret |
| 37 | 2 moles of 8-β-sulfatoethyl-sulfonyl-2-amino-naphthalene-6-sulfonic acid | condensation product of 2 moles of the primary condensation product obtained from equimolar amounts of cyanuric chloride and 1-amino-8-naphthol-4,6-disulfonic acid with 1 mole of 4,4'-diaminostilbene-2,2'-disulfonic acid | claret |
| 38 | 2 moles of 6-β-sulfatoethyl-sulfonyl-2-amino-naphthalene-1-sulfonic acid | condensation product of 2 moles of the primary condensation product obtained from equimolar amounts of cyanuric chloride and 1-amino-8-naphthol-4,6-disulfonic acid with 1 mole of 4,4'-diaminostilbene-2,2'-disulfonic acid | bluish-tinged red |
| 39 | 2 moles of 2-naphthylamine-6-β-sulfatoethylsulfone | condensation product of 2 moles of the primary condensation product obtained from equimolar amounts of cyanuric chloride and 1-amino-8-naphthol-4,6-disulfonic acid with 1 mole of 4,4'-diaminostilbene-2,2'-disulfonic acid | bluish-tinged red |
| 40 | 2 moles of 2-naphthylamine-8-β-sulfatoethylsulfone | condensation product of 2 moles of the primary condensation product obtained from equimolar amounts of cyanuric chloride and 1-amino-8-naphthol-4,6-disulfonic acid with 1 mole of 4,4'-diaminostilbene-2,2'-disulfonic acid | bluish-tinged red |
| 41 | 2 moles of 2-naphthylamine-5-β-sulfatoethylsulfone | condensation product of 2 moles of the primary condensation product obtained from equimolar amounts of cyanuric chloride and 1-amino-8-naphthol-4,6-disulfonic acid with 1 mole of 4,4'-diaminostilbene-2,2'-disulfonic acid | red |
| 42 | 2 moles of aniline-4-β-sulfatoethylsulfone | condensation product of 2 moles of the condensation product obtained from equimolar amounts of cyanuric chloride and 2-amino-8-naphthol-6-sulfonic acid with 1 mole of 4,4'-diaminostilbene-2,2'-disulfonic acid | red |
| 43 | 2 moles of aniline-3-β sulfatoethylsulfone | condensation product of 2 moles of the condensation product obtained from equimolar amounts of cyanuric chloride and 2-amino-8-naphthol-6-sulfonic acid with 1 mole of 4,4'-diaminostilbene-2,2'-disulfonic acid | orange |
| 44 | 2 moles of aniline-4-vinyl-sulfone | condensation product of 2 moles of the condensation product obtained from equimolar amounts of cyanuric chloride and 2-amino-8-naphthol-6-sulfonic acid with 1 mole of 4,4'-diaminostilbene-2,2'-disulfonic acid | orange |
| 45 | 2 moles of aniline-4-β-thio-sulfatoethylsulfone | condensation product of 2 moles of the condensation product obtained from equimolar amounts of cyanuric chloride and 2-amino-8-napthol-6-sulfonic acid with 1 mole of 4,4'-diaminostilbene-2,2'-disulfonic acid | orange |
| 46 | 2 moles of 2-aminoanisole-4-β-sulfatoethylsulfone | condensation product of 2 moles of the condensation product obtained from equimolar amounts of cyanuric chloride and 2-amino-8-naphthol-6-sulfonic acid with 1 mole of 4,4'-diaminostilbene-2,2'-disulfonic acid | red |
| 47 | 2 moles of aniline-3-vinyl-sulfone | condensation product of 2 moles of the condensation product obtained from equimolar amounts of cyanuric chloride and 2-amino-8-naphthol-6-sulfonic acid with 1 mole of 4,4'-diaminostilbene-2,2'-disulfonic acid | orange |
| 48 | 2 moles of 2-aminoanisole-4-β-thiosulfatoethylsulfone | condensation product of 2 moles of the condensation product obtained from equimolar amounts of cyanuric chloride and 2-amino-8-naphthol-6-sulfonic acid with 1 mole of 4,4'-diaminostilbene-2,2'-disulfonic acid | red |
| 49 | 2 moles of 2,5-dimethoxyaniline-4-β-sulfatoethylsulfone | condensation product of 2 moles of the condensation product obtained from | bluish-tinged red |

TABLE 1-continued

| Example No. | Diazo component | Coupling component | Color shade on cotton |
|---|---|---|---|
| | | equimolar amounts of cyanuric chloride and 2-amino-8-naphthol-6-sulfonic acid with 1 mole of 4,4'-diaminostilbene-2,2'-disulfonic acid | |
| 50 | 2 moles of 2-methoxy-5-methyl-aniline-4-β-sulfatoethyl-sulfone | condensation product of 2 moles of the condensation product obtained from equimolar amounts of cyanuric chloride and 2-amino-8-naphthol-6-sulfonic acid with 1 mole of 4,4'-diaminostilbene-2,2'-disulfonic acid | red |
| 51 | 2 moles of 2-aminonaphthalene-8-β-sulfatoethylsulfone | condensation product of 2 moles of the condensation product obtained from equimolar amounts of cyanuric chloride and 2-amino-8-naphthol-6-sulfonic acid with 1 mole of 4,4'-diaminostilbene-2,2'-disulfonic acid | red |
| 52 | 2 moles of 2-aminonaphthalene-6-β-sulfatoethylsulfone | condensation product of 2 moles of the condensation product obtained from equimolar amounts of cyanuric chloride and 2-amino-8-naphthol-6-sulfonic acid with 1 mole of 4,4'-diaminostilbene-2,2'-disulfonic acid | red |
| 53 | 2 moles of 2-aminonaphthalene-5-β-sulfatoethylsulfone | condensation product of 2 moles of the condensation product obtained from equimolar amounts of cyanuric chloride and 2-amino-8-naphthol-6-sulfonic acid with 1 mole of 4,4'-diaminostilbene-2,2'-disulfonic acid | red |
| 54 | 2 moles of aniline-4-β-sulfatoethylsulfone | condensation product of 2 moles of the condensation product obtained from equimolar amounts of cyanuric chloride and 2-amino-5-naphthol-7-sulfonic acid with 1 mole of 4,4'-diaminostilbene-2,2'-disulfonic acid | orange |
| 55 | 2 moles of aniline-4-β-thio-sulfatoethylsulfone | condensation product of 2 moles of the condensation product obtained from equimolar amounts of cyanuric chloride and 2-amino-5-naphthol-7-sulfonic acid with 1 mole of 4,4'-diaminostilbene-2,2'-disulfonic acid | orange |
| 56 | 2 moles of aniline-3-vinyl-sulfone | condensation product of 2 moles of the condensation product obtained from equimolar amounts of cyanuric chloride and 2-amino-5-naphthol-7-sulfonic acid with 1 mole of 4,4'-diaminostilbene-2,2'-disulfonic acid | orange |
| 57 | 2 moles of aniline-3-β-sulfatoethylsulfone | condensation product of 2 moles of the condensation product obtained from equimolar amounts of cyanuric chloride and 2-amino-5-naphthol-7-sulfonic acid with 1 mole of 4,4'-diaminostilbene-2,2'-disulfonic acid | orange |
| 58 | 2 moles of 2-aminoanisole-4-β-sulfatoethylsulfone | condensation product of 2 moles of the condensation product obtained from equimolar amounts of cyanuric chloride and 2-amino-5-naphthol-7-sulfonic acid with 1 mole of 4,4'-diaminostilbene-2,2'-disulfonic acid | reddish-tinged orange |
| 59 | 2 moles of 2-aminoanisole-4-β-thiosulfatoethylsulfone | condensation product of 2 moles of the condensation product obtained from equimolar amounts of cyanuric chloride and 2-amino-5-naphthol-7-sulfonic acid with 1 mole of 4,4'-diaminostilbene-2,2'-disulfonic acid | reddish-tinged orange |
| 60 | 2 moles of 2-aminoanisole-5-β-sulfatoethylsulfone | condensation product of 2 moles of the condensation product obtained from equimolar amounts of cyanuric chloride and 2-amino-5-naphthol-7-sulfonic acid with 1 mole of 4,4'-diaminostilbene-2,2'-disulfonic acid | red |
| 61 | 2 moles of 2-methoxy-5-methyl-aniline-4-β-sulfatoethyl-sulfone | condensation product of 2 moles of the condensation product obtained from equimolar amounts of cyanuric chloride and 2-amino-5-naphthol-7-sulfonic acid with 1 mole of 4,4'-diaminostilbene-2,2'-disulfonic acid | red |
| 62 | 2 moles of 2,5-dimethoxyaniline-4-β-sulfatoethylsulfone | condensation product of 2 moles of the condensation product obtained from equimolar amounts of cyanuric chloride and 2-amino-5-naphthol-7-sulfonic acid | red |

TABLE 1-continued

| Example No. | Diazo component | Coupling component | Color shade on cotton |
|---|---|---|---|
| 63 | 2 moles of 2-aminonaphthalene-8-β-sulfatoethylsulfone | condensation product of 2 moles of the condensation product obtained from equimolar amounts of cyanuric chloride and 2-amino-5-naphthol-7-sulfonic acid with 1 mole of 4,4'-diaminostilbene-2,2'-disulfonic acid | reddish-tinged orange |
| 64 | 2 moles of 8-β-sulfatoethyl-sulfonyl-2-amino-naphthalene-6-sulfonic acid | condensation product of 2 moles of the condensation product obtained from equimolar amounts of cyanuric chloride and 2-amino-5-naphthol-7-sulfonic acid with 1 mole of 4,4'-diaminostilbene-2,2'-disulfonic acid | reddish-tinged orange |
| 65 | 2 moles of 6-β-sulfatoethyl-sulfonyl-2-amino-naphthalene-1-sulfonic acid | condensation product of 2 moles of the condensation product obtained from equimolar amounts of cyanuric chloride and 2-amino-5-naphthol-7-sulfonic acid with 1 mole of 4,4'-diaminostilbene-2,2'-disulfonic acid | orange |
| 66 | 2 moles of aniline-4-β-sulfatoethylsulfone | condensation product of 2 moles of the condensation product obtained from equimolar amounts of cyanuric bromide and 1-amino-8-naphthol-3,6-disulfonic acid with 1 mole of 4,4'-diamino-stilbene-2,2'-disulfonic acid | red |
| 67 | 2 moles of aniline-3-β-sulfatoethylsulfone | condensation product of 2 moles of the condensation product obtained from equimolar amounts of cyanuric bromide and 1-amino-8-naphthol-3,6-disulfonic acid with 1 mole of 4,4'-diamino-stilbene-2,2'-disulfonic acid | red |
| 68 | 2 moles of aniline-4-β-thiosulfatoethylsulfone | condensation product of 2 moles of the condensation product obtained from equimolar amounts of cyanuric bromide and 1-amino-8-naphthol-3,6-disulfonic acid with 1 mole of 4,4'-diamino-stilbene-2,2'-disulfonic acid | red |
| 69 | 2 moles of aniline-3-vinyl-sulfone | condensation product of 2 moles of the condensation product obtained from equimolar amounts of cyanuric bromide and 1 amino-8-naphthol-3,6-disulfonic acid with 1 mole of 4,4'-diamino-stilbene-2,2'-disulfonic acid | red |
| 70 | 2 moles of 2-aminoanisole-4-β-sulfatoethylsulfone | condensation product of 2 moles of the condensation product obtained from equimolar amounts of cyanuric bromide and 1-amino-8-naphthol-3,6-disulfonic acid with 1 mole of 4,4'-diamino-stilbene-2,2'-disulfonic acid | claret |
| 71 | 2 moles of 2-aminoanisole-4-β-thiosulfatoethylsulfone | condensation product of 2 moles of the condensation product obtained from equimolar amounts of cyanuric bromide and 1-amino-8-naphthol-3,6-disulfonic acid with 1 mole of 4,4'-diamino-stilbene-2,2'-disulfonic acid | claret |
| 72 | 2 moles of 2-aminoanisole-5-β-sulfatoethylsulfone | condensation product of 2 moles of the condensation product obtained from equimolar amounts of cyanuric bromide and 1-amino-8-naphthol-3,6-disulfonic acid with 1 mole of 4,4'-diamino-stilbene-2,2'-disulfonic acid | bluish-tinged red |
| 73 | 2 moles of 2,5-dimethoxy-aniline-4-β-sulfatoethyl-sulfone | condensation product of 2 moles of the condensation product obtained from equimolar amounts of cyanuric bromide and 1-amino-8-naphthol-3,6-disulfonic acid with 1 mole of 4,4'-diamino-stilbene-2,2'-disulfonic acid | claret |
| 74 | 2 moles of 2-methoxy-5-methyl-aniline-4-β-sulfatoethyl sulfone | condensation product of 2 moles of the condensation product obtained from equimolar amounts of cyanuric bromide and 1-amino-8-naphthol-3,6-disulfonic acid with 1 mole of 4,4'-diamino-stilbene-2,2'-disulfonic acid | claret |
| 75 | 2 moles of 8-β-sulfatoethyl-sulfonyl-2-aminonaphthalene-6-sulfonic acid | condensation product of 2 moles of the condensation product obtained from equimolar amounts of cyanuric bromide and 1-amino-8-naphthol-3,6-disulfonic acid with 1 mole of 4,4'-diamino-stilbene-2,2'-disulfonic acid | claret |

TABLE 1-continued

| Example No. | Diazo component | Coupling component | Color shade on cotton |
|---|---|---|---|
| 76 | 2 moles of 6-β-sulfatoethyl-sulfonyl-2-aminonaphthalene-1-sulfonic acid | condensation product of 2 moles of the condensation product obtained from equimolar amounts of cyanuric bromide and 1-amino-8-naphthol-3,6-disulfonic acid with 1 mole of 4,4'-diamino-stilbene-2,2'-disulfonic acid | bluish-tinged red |
| 77 | 2 moles of aniline-4-β-sulfatoethylsulfone | condensation product of 2 moles of the condensation product obtained from equimolar amounts of cyanuric fluoride and 1-amino-8-naphthol-3,6-disulfonic acid with 1 mole of 4,4'-diamino-stilbene-2,2'-disulfonic acid | red |
| 78 | 2 moles of aniline-3-β-sulfatoethylsulfone | condensation product of 2 moles of the condensation product obtained from equimolar amounts of cyanuric fluoride and 1-amino-8-naphthol-3,6-disulfonic acid with 1 mole of 4,4'-diamino-stilbene-2,2'-disulfonic acid | red |
| 79 | 2 moles of 2-aminoanisole-4-β-sulfatoethylsulfone | condensation product of 2 moles of the condensation product obtained from equimolar amounts of cyanuric fluoride and 1-amino-8-naphthol-3,6-disulfonic acid with 1 mole of 4,4'-diamino-stilbene-2,2'-disulfonic acid | claret |
| 80 | 2 moles of aniline-4-β-thio-sulfatoethylsulfone | condensation product of 2 moles of the condensation product obtained from equimolar amounts of cyanuric fluoride and 1-amino-8-naphthol-3,6-disulfonic acid with 1 mole of 4,4'-diamino-stilbene-2,2'-disulfonic acid | red |
| 81 | 2 moles of aniline-4-vinyl-sulfone | condensation product of 2 moles of the condensation product obtained from equimolar amounts of cyanuric fluoride and 1-amino-8-naphthol-3,6-disulfonic acid with 1 mole of 4,4'-diamino-stilbene-2,2'-disulfonic acid | red |
| 82 | 2 moles of aniline-3-vinyl-sulfone | condensation product of 2 moles of the condensation product obtained from equimolar amounts of cyanuric fluoride and 1-amino-8-naphthol-3,6-disulfonic acid with 1 mole of 4,4'-diamino-stilbene-2,2'-disulfonic acid | red |
| 83 | 2 moles of 2-aminoanisole-4-β-thiosulfatoethylsulfone | condensation product of 2 moles of the condensation product obtained from equimolar amounts of cyanuric chloride and 1-amino-8-naphthol-3,6-disulfonic acid with 1 mole of 3,3'-dimethoxy-benzidine-6,6'-disulfonic acid | claret |
| 84 | 2 moles of 2,5-dimethoxyaniline-4-β-sulfatoethylsulfone | condensation product of 2 moles of the condensation product obtained from equimolar amounts of cyanuric chloride and 1-amino-8-naphthol-3,6-disulfonic acid with 1 mole of 3,3'-dimethoxy-benzidine-6,6'-disulfonic acid | claret |
| 85 | 2 moles of 2-methoxy-5-methyl-aniline-4-β-sulfatoethylsulfone | condensation product of 2 moles of the condensation product obtained from equimolar amounts of cyanuric chloride and 1-amino-8-naphthol-3,6-disulfonic acid with 1 mole of 3,3'-dimethoxy-benzidine-6,6'-disulfonic acid | claret |
| 86 | 2 moles of 8-β-sulfatoethyl-sulfonyl-2-amino-naphthalene-6-sulfonic acid | condensation product of 2 moles of the condensation product obtained from equimolar amounts of cyanuric chloride and 1-amino-8-naphthol-3,6-disulfonic acid with 1 mole of 3,3'-dimethoxy-benzidine-6,6'-disulfonic acid | claret |
| 87 | 2 moles of 6-β-sulfatoethyl-sulfonyl-2-amino-naphthalene-1-sulfonic acid | condensation product of 2 moles of the condensation product obtained from equimolar amounts of cyanuric chloride and 1-amino-8-naphthol-3,6-disulfonic acid with 1 mole of 3,3'-dimethoxy-benzidine-6,6'-disulfonic acid | bluish-tinged red |
| 88 | 2 moles of aniline-4-β-sulfatoethylsulfone | condensation product of 2 moles of the condensation product obtained from equimolar amounts of cyanuric chloride and 1-amino-8-naphthol-3,6-disulfonic acid with 1 mole of 3,3'-dimethoxy-benzidine-6,6'-disulfonic acid | red |
| 89 | 2 moles of aniline-4-β-thio-sulfatoethylsulfone | condensation product of 2 moles of the condensation product obtained from | red |

TABLE 1-continued

| Example No. | Diazo component | Coupling component | Color shade on cotton |
|---|---|---|---|
| 90 | 2 moles of aniline-3-β-sulfatoethylsulfone | equimolar amounts of cyanuric chloride and 1-amino-8-naphthol-3,6-disulfonic acid with 1 mole of 3,3'-dimethoxy-benzidine-6,6'-disulfonic acid condensation product of 2 moles of the condensation product obtained from equimolar amounts of cyanuric chloride and 1-amino-8-naphthol-3,6-disulfonic acid with 1 mole of 3,3'-dimethoxy-benzidine-6,6'-disulfonic acid | red |
| 91 | 2 moles of 2-aminoanisole-4-β-sulfatoethylsulfone | condensation product of 2 moles of the condensation product obtained from equimolar amounts of cyanuric chloride and 2-amino-8-naphthol-6-sulfonic acid with 1 mole of 3,3'-dimethoxy-6,6'-disulfonic acid | orange |
| 92 | 2 moles of 2-methoxy-5-methyl-aniline-4-β-sulfatoethyl-sulfone | condensation product of 2 moles of the condensation product obtained from equimolar amounts of cyanuric chloride and 2-amino-8-naphthol-6-sulfonic acid with 1 mole of 3,3'-dimethoxy-6,6'-disulfonic acid | red |
| 93 | 2 moles of aniline-4-β-sulfato-ethylsulfone | condensation product of 2 moles of the condensation product obtained from equimolar amounts of cyanuric chloride and 2-amino-8-naphthol-6-sulfonic acid with 1 mole of 3,3'-dimethoxy-6,6'-disulfonic acid | orange |
| 94 | 2 moles of 8-β-sulfatoethyl-sulfonyl-2-amino-naphthalene-6-sulfonic acid | condensation product of 2 moles of the condensation product obtained from equimolar amounts of cyanuric chloride and 2-amino-8-naphthol-6-sulfonic acid with 1 mole of 3,3'-dimethoxy-6,6'-disulfonic acid | red |
| 95 | 2 moles of 6-β-sulfatoethyl-sulfonyl-2-amino-naphthalene 1-sulfonic acid | condensation product of 2 moles of the condensation product obtained from equimolar amounts of cyanuric chloride and 2-amino-8-naphthol-6-sulfonic acid with 1 mole of 3,3'-dimethoxy-6,6'-disulfonic acid | red |
| 96 | 2 moles of 2,5-dimethoxyaniline-4-β-sulfatoethylsulfone | condensation product of 2 moles of the condensation product obtained from equimolar amounts of cyanuric chloride and 2-amino-8-naphthol-6-sulfonic acid with 1 mole of 3,3'-dimethoxy-6,6'-disulfonic acid | bluish-tinged red |
| 97 | 2 moles of aniline-4-β-sulfato-ethylsulfone | condensation product of 2 moles of the condensation product obtained from equimolar amounts of cyanuric chloride and 2-amino-5-naphthol-7-sulfonic acid with 1 mole of 3,3'-dimethoxy-benzidine-6,6'-disulfonic acid | orange |
| 98 | 2 moles of 2-aminoanisole-4-β-thiosulfatoethylsulfone | condensation product of 2 moles of the condensation product obtained from equimolar amounts of cyanuric chloride with 1 mole of 3,3'-dimethoxy-benzidine-6,6'-disulfonic acid | reddish-tinged orange |
| 99 | 2 moles of aniline-3-vinyl-sulfone | condensation product of 2 moles of the condensation product obtained from equimolar amounts of cyanuric chloride and 2-amino-5-naphthol-7-sulfonic acid with 1 mole of 3,3'-dimethoxy-benzidine-6,6'-disulfonic acid | orange |
| 100 | 2 moles of 2,6-dimethylaniline-4-β-sulfatoethylsulfone | condensation product of 2 moles of the condensation product obtained from equimolar amounts of cyanuric chloride and 2-amino-5-naphthol-7-sulfonic acid with 1 mole of 3,3'dimethoxy-benzidine-6,6'-disulfonic acid | orange |
| 101 | 2 moles of aniline-4-β-sulfato-ethylsulfone | reaction product of 2 moles of the primary condensation product obtained from equimolar amounts of cyanuric chloride and 1-amino-8-hydroxy-naphthalene-3,6-disulfonic acid with 1 mole of 1,1-bis-(4'-aminophenyl)-cyclohexane | red |
| 102 | 2 moles of aniline-4-β-chloro-ethylsulfone | reaction product of 2 moles of the primary condensation product obtained from equimolar amounts of cyanuric chloride and 1-amino-8-hydroxy- | red |

TABLE 1-continued

| Example No. | Diazo component | Coupling component | Color shade on cotton |
|---|---|---|---|
| | | naphthalene-3,6-disulfonic acid with 1 mole of 1,1-bis-(4'-aminophenyl)-cyclohexane | |
| 103 | 2 moles of aniline-3-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,1-bis-(4'-aminophenyl)-cyclohexane | red |
| 104 | 2 moles of 2-aminoanisole-5-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,1-bis-(4'-aminophenyl)-cyclohexane | claret |
| 105 | 2 moles of 2-aminoanisole-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,1-bis-(4'-aminophenyl)-cyclohexane | claret |
| 106 | 2 moles of 2-aminotoluene-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,1-bis-(4'-aminophenyl)-cyclohexane | red |
| 107 | 2 moles of 2-methoxy-5-methylaniline-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,1-bis-(4'-aminophenyl)-cyclohexane | claret |
| 108 | 2 moles of 2,5-dimethoxyaniline-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,1-bis-(4'-aminophenyl)-cyclohexane | claret |
| 109 | 2 moles of 2-chloroaniline-5-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,1-bis-(4'-aminophenyl)-cyclohexane | red |
| 110 | 2 moles of 2,6-dimethylaniline-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,1-bis-(4'-aminophenyl)-cyclohexane | red |
| 111 | 2 moles of 2,6-dimethylaniline-3-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,1-bis-(4'-aminophenyl)-cyclohexane | red |
| 112 | 2 moles of 2,4-dimethoxyaniline-5-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,1-bis-(4'-aminophenyl)-cyclohexane | bluish-tinged red |
| 113 | 2 moles of 2-aminoanisole-4-β-thiosulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,1-bis-(4'-aminophenyl)-cyclohexane | claret |

TABLE 1-continued

| Example No. | Diazo component | Coupling component | Color shade on cotton |
|---|---|---|---|
| 114 | 2 moles of aniline-4-β-thio-sulfatoethylsulfone | reaction product of 2 moles of the primary condensation product obtained from equimolar amounts of cyanuric chloride and 1-amino-8-hydroxy-naphthalene-3,6-disulfonic acid with 1 mole of 1,1-bis-(4'-aminophenyl)-cyclohexane | red |
| 115 | 2 moles of 4-aminoanisole-2-β-sulfatoethylsulfone | reaction product of 2 moles of the primary condensation product obtained from equimolar amounts of cyanuric chloride and 1-amino-8-hydroxy-naphhthalene-3,6-disulfonic acid with 1 mole of 1,1-bis-(4'-aminophenyl)-cyclohexane | red |
| 116 | 2 moles of 4-β-sulfatoethyl-sulfonylaniline-2-sulfonic acid | reaction product of 2 moles of the primary condensation product obtained from equimolar amounts of cyanuric chloride and 1-amino-8-hydroxy-naphthalene-3,6-disulfonic acid with 1 mole of 1,1-bis-(4'-aminophenyl)-cyclohexane | red |
| 117 | 2 moles of 4-aminotoluene-2-β-sulfatoethylsulfone | reaction product of 2 moles of the primary condensation product obtained from equimolar amounts of cyanuric chloride and 2-amino-8-hydroxy-naphthalene-6-sulfonic acid with 1 mole of 1,1-bis-(4'-amino-3'-sulfophenyl)-cyclohexane | orange |
| 118 | 2 moles of 2-aminoanisole-4-vinylsulfone | reaction product of 2 moles of the primary condensation product obtained from equimolar amounts of cyanuric chloride and 2-amino-8-hydroxy-naphthalene-6-sulfonic acid with 1 mole of 1,1-bis-(4'-amino-3'-sulfo-phenyl)-cyclohexane | yellowish-tinged red |
| 119 | 2 moles of aniline-4-vinyl sulfone | reaction product of 2 moles of the primary condensation product obtained from equimolar amounts of cyanuric chloride and 2-amino-8-hydroxy-naphthalene-6-sulfonic acid with 1 mole of 1,1-bis-(4'-amino-3'-sulfo-phenyl)-cyclohexane | orange |
| 120 | 2 moles of aniline-3-vinyl-sulfone | reaction product of 2 moles of the primary condensation product obtained from equimolar amounts of cyanuric chloride and 2-amino-8-hydroxy-naphthalene-6-sulfonic acid with 1 mole of 1,1-bis-(4'-amino-3'-sulfo-phenyl)-cyclohexane | orange |
| 121 | 2 moles of 2-bromoaniline-4-β-sulfatoethylsulfone | reaction product of 2 moles of the primary condensation product obtained from equimolar amounts of cyanuric chloride and 2-amino-8-hydroxy-naphhthalene-6-sulfonic acid with 1 mole of 1,1-bis-(4'-amino-3'-sulfo-phenyl)-cyclohexane | orange |
| 122 | 2 moles of 2,6-dichloroaniline-4-β-sulfatoethylsulfone | reaction product of 2 moles of the primary condensation product obtained from equimolar amounts of cyanuric chloride and 2-amino-8-hydroxy-naphthalene-6-sulfonic acid with 1 mole of 1,1-bis-(4'-amino-3'-sulfo-phenyl)-cyclohexane | orange |
| 123 | 2 moles of 6-β-sulfatoethyl-sulfonyl-2-amino-naphthalene-1-sulfonic acid | reaction product of 2 moles of the primary condensation product obtained from equimolar amounts of cyanuric chloride and 2-amino-8-hydroxy-naphthalene-6-sulfonic acid with 1 mole of 1,1-bis-(4'-amino-3'-sulfo-phenyl)-cyclohexane | yellowish-tinged red |
| 124 | 2 moles of 2-naphthylamine-5-β-sulfatoethylsulfone | reaction product of 2 moles of the primary condensation product obtained from equimolar amounts of cyanuric chloride and 2-amino-8-hydroxy-naphthalene-6-sulfonic acid with 1 mole of 1,1-bis-(4'-amino-3'-sulfo-phenyl)-cyclohexane | orange |
| 125 | 2 moles of 2-naphthylamine-8-β-sulfatoethylsulfone | reaction product of 2 moles of the primary condensation product obtained from equimolar amounts of cyanuric | yellowish-tinged red |

TABLE 1-continued

| Example No. | Diazo component | Coupling component | Color shade on cotton |
|---|---|---|---|
| | | chloride and 2-amino-8-hydroxy-naphthalene-6-sulfonic acid with 1 mole of 1,1-bis-(4'-amino-3'-sulfophenyl)-cyclohexane | |
| 126 | 2 moles of 2-naphthylamine-6-β-sulfatoethylsulfone | reaction product of 2 moles of the primary condensation product obtained from equimolar amounts of cyanuric chloride and 2-amino-8-hydroxy-naphthalene-6-sulfonic acid with 1 mole of 1,1-bis-(4'-amino-3'-sulfophenyl)-cyclohexane | yellowish-tinged red |
| 127 | 2 moles of 2-chloroaniline-4-β-sulfatoethylsulfone | reaction product of 2 moles of the primary condensation product obtained from equimolar amounts of cyanuric chloride and 2-amino-8-hydroxy-naphthalene-6-sulfonic acid with 1 mole of 1,1-bis-(4'-amino-3'-sulfophenyl)-cyclohexane | orange |
| 128 | 2 moles of 2-amino-4-β-sulfatoethylsulfonyl-benzoic acid | reaction product of 2 moles of the primary condensation product obtained from equimolar amounts of cyanuric chloride and 2-amino-8-hydroxy-naphthalene-6-sulfonic acid with 1 mole of 1,1-bis-(4'-amino-3'-sulfophenyl)-cyclohexane | orange |
| 129 | 2 moles of 5-β-sulfatoethyl-sulfonyl-aniline-2-sulfonic acid | reaction product of 2 moles of the primary condensation product obtained from equimolar amounts of cyanuric chloride and 2-amino-8-hydroxy-naphthalene-6-sulfonic acid with 1 mole of 1,1-bis-(4'-amino-3'-sulfophenyl)-cyclohexane | orange |
| 130 | 2 moles of aniline-4-β-sulfatoethylsulfone | reaction product of 2 moles of the primary condensation product obtained from equimolar amounts of cyanuric chloride and 2-amino-5-hydroxy-naphthalene-7-sulfonic acid with 1 mole of 4,4'-diaminodiphenylamine-2-sulfonic acid | orange |
| 131 | 2 moles of aniline-3-β-sulfatoethylsulfone | reaction product of 2 moles of the primary condensation product obtained from equimolar amounts of cyanuric chloride and 2-amino-5-hydroxy-naphthalene-7-sulfonic acid with 1 mole of 4,4'-diaminodiphenylamine-2-sulfonic acid | orange |
| 132 | 2 moles of aniline-4-β-thio-sulfatoethylsulfone | reaction product of 2 moles of the primary condensation product obtained from equimolar amounts of cyanuric chloride and 2-amino-5-hydroxy-naphthalene-7-sulfonic acid with 1 mole of 4,4'diaminodiphenylamine-2-sulfonic acid | orange |
| 133 | 2 moles of aniline-4-vinyl-sulfone | reaction product of 2 moles of the primary condensation product obtained from equimolar amounts of cyanuric chloride and 2-amino-5-hydroxy-naphthalene-7-sulfonic acid with 1 mole of 4,4'-diaminodiphenylamine-2-sulfonic acid | orange |
| 134 | 2 moles of 2-aminoanisole-4-β-sulfatoethylsulfone | reaction product of 2 moles of the primary condensation product of equimolar amounts of cyanuric chloride and 1-amino-8-hydroxynaphthalene-4,6-disulfonic acid with 1 mole of 1,6-diaminohexane | bluish-tinged red |
| 135 | 2 moles of 2-methoxy-5-methyl-aniline-4-β-sulfatoethylsulfone | reaction product of 2 moles of the primary condensation product of equimolar amounts of cyanuric chloride and 1-amino-8-hydroxynaphthalene-4,6-disulfonic acid with 1 mole of 1,6-diaminohexane | bluish-tinged red |
| 136 | 2 moles of 2,5-dimethoxyaniline-4-β-sulfatoethylsulfone | reaction product of 2 moles of the primary condensation product of equimolar amounts of cyanuric chloride and 1-amino-8-hydroxynaphthalene-4,6-disulfonic acid with 1 mole of 1,6-diaminohexane | claret |
| 137 | 2 moles of 8-β-sulfatoethyl-sulfonyl-2-amino-naphthalene- | reaction product of 2 moles of the primary condensation product of equi- | bluish-tinged red |

TABLE 1-continued

| Example No. | Diazo component | Coupling component | Color shade on cotton |
|---|---|---|---|
| | 6-sulfonic acid | molar amounts of cyanuric chloride and 1-amino-8-hydroxynaphthalene-4,6-disulfonic acid with 1 mole of 1,6-diaminohexane | |
| 138 | 2 moles of 6-β-sulfatoethyl-sulfonyl-2-amino-naphthalene-1-sulfonic acid | reaction product of 2 moles of the primary condensation product of equimolar amounts of cyanuric chloride and 1-amino-8-hydroxynaphthalene-4,6-disulfonic acid with 1 mole of 1,6-diaminohexane | bluish-tinged red |
| 139 | 2 moles of 2-naphthylamine-6-β-sulfatoethylsulfone | reaction product of 2 moles of the primary condensation product of equimolar amounts of cyanuric chloride and 1-amino-8-hydroxynaphthalene-4,6-disulfonic acid with 1 mole of 1,6-diaminohexane | bluish-tinged red |
| 140 | 2 moles of 2-naphthylamine-8-β-sulfatoethylsulfone | reaction product of 2 moles of the primary condensation product of equimolar amounts of cyanuric chloride and 1-amino-8-hydroxynaphthalene-4,6-disulfonic acid with 1 mole of 1,6-diaminohexane | bluish-tinged red |
| 141 | 2 moles of 2-naphthylamine-5-β-sulfatoethylsulfone | reaction product of 2 moles of the primary condensation product of equimolar amounts of cyanuric chloride and 1-amino-8-hydroxynaphthalene-4,6-disulfonic acid with 1 mole of 1,6-diaminohexane | bluish-tinged red |
| 142 | 2 moles of aniline-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,4-diaminobutane | red |
| 143 | 2 moles of aniline-3-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,4-diaminobutane | red |
| 144 | 2 moles of aniline-4-vinylsulfone | reaction product of 2 moles of the primary condensation product obtained from equimolar amounts of cyanuric chloride and 1-amino-8-hydroxynaphthalene-3,6-disulfonic acid with 1 mole of 1,4-diaminobutane | red |
| 145 | 2 moles of aniline-4-β-thio-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,4-diaminobutane | red |
| 146 | 2 moles of 2-aminoanisole-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,4-diaminobutane | bluish-tinged red |
| 147 | 2 moles of aniline-3-vinylsulfone | reaction product of 2 moles of the primary condensation product obtained from equimolar amounts of cyanuric chloride and 1-amino-8-hydroxynaphthalene-3,6-disulfonic acid with 1 mole of 1,4-diaminobutane | red |
| 148 | 2 moles of 2-aminoanisole-4-β-thiosulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,4-diaminobutane | bluish-tinged red |
| 149 | 2 moles of 2,5-dimethoxyaniline-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 1,4-diaminobutane | claret |
| 150 | 2 moles of 2-methoxy-5-methyl-aniline-4-β-sulfatoethylsulfone | reaction product of 2 moles of the primary condensation product obtained from equimolar amounts of cyanuric chloride and 2-amino-5-hydroxy- | yellowish-tinged red |

TABLE 1-continued

| Example No. | Diazo component | Coupling component | Color shade on cotton |
|---|---|---|---|
| 151 | 2 moles of 2-aminonaphthalene-8-β-sulfatoethylsulfone | reaction product of 2 moles of the primary condensation product obtained from equimolar amounts of cyanuric chloride and 2-amino-5-hydroxy-naphthalene-1,7-disulfonic acid and 1 mole of 1,2-diaminoethane | yellowish-tinged red |
| 152 | 2 moles of 2-aminonaphthalene-6-β-sulfatoethylsulfone | reaction product of 2 moles of the primary condensation product obtained from equimolar amounts of cyanuric chloride and 2-amino-5-hydroxy-naphthalene-1,7-disulfonic acid and 1 mole of 1,2-diaminoethane | yellowish-tinged red |
| 153 | 2 moles of 2-aminonaphthalene-5-β-sulfatoethylsulfone | reaction product of 2 moles of the primary condensation product obtained from equimolar amounts of cyanuric chloride and 2-amino-5-hydroxy-naphthalene-1,7-disulfonic acid and 1 mole of 1,2-diaminoethane | yellowish-tinged red |
| 154 | 2 moles of aniline-4-β-sulfatoethylsulfone | reaction product of 2 moles of the primary condensation product obtained from equimolar amounts of cyanuric chloride and 2-amino-8-hydroxy-naphthalene-3,6-disulfonic acid with 1 mole of 1,3-bis-aminomethyl-cyclohexane | red |
| 155 | 2 moles of aniline-4-β-thiosulfatoethylsulfone | reaction product of 2 moles of the primary condensation product obtained from equimolar amounts of cyanuric chloride and 2-amino-8-hydroxy-naphthalene-3,6-disulfonic acid with 1 mole of 1,3-bis-aminomethyl-cyclohexane | red |
| 156 | 2 moles of aniline-3-vinyl-sulfone | reaction product of 2 moles of the primary condensation product obtained from equimolar amounts of cyanuric chloride and 2-amino-8-hydroxy-naphthalene-3,6-disulfonic acid with 1 mole of 1,3-bis-aminomethyl-cyclohexane | red |
| 157 | 2 moles of aniline-3-β-sulfatoethylsulfone | reaction product of 2 moles of the primary condensation product obtained from equimolar amounts of cyanuric chloride and 2-amino-8-hydroxy-naphthalene-3,6-disulfonic acid with 1 mole of 1,3-bis-aminomethyl-cyclohexane | red |
| 158 | 2 moles of 2-aminoanisole-4-β-sulfatoethylsulfone | reaction product of 2 moles of the primary condensation product obtained from equimolar anounts of cyanuric chloride and 2-amino-8-hydroxy-naphthalene-3,6-disulfonic acid with 1 mole of 1,3-bis-aminomethyl-cyclohexane | red |
| 159 | 2 moles of 2-aminoanisole-4-β-thiosulfatoethylsulfone | reaction product of 2 moles of the primary condensation product obtained from equimolar amounts of cyanuric chloride and 2-amino-8-hydroxy-naphthalene-3,6-disulfonic acid with 1 mole of 1,3-bis-aminomethyl-cyclohexane | red |
| 160 | 2 moles of 2-aminoanisole-5-β-sulfatoethylsulfone | reaction product of 2 moles of the primary condensation product obtained from equimolar amounts of cyanuric chloride and 2-amino-8-hydroxy-naphthalene-3,6-disulfonic acid with 1 mole of 1,3-bis-aminomethyl-cyclohexane | red |
| 161 | 2 moles of 2-methoxy-5-methyl-aniline-4-β-sulfatoethylsulfone | reaction product of 2 moles of the primary condensation product obtained from equimolar amounts of cyanuric chloride and 2-amino-8-hydroxy-naphthalene-3,6-disulfonic acid with 1 mole of 1,3-bis-aminomethyl-cyclohexane | bluish-tinged red |
| 162 | 2 moles of 2,5-dimethoxyaniline-4-β-sulfatoethylsulfone | reaction product of 2 moles of the primary condensation product obtained from equimolar amounts of cyanuric chloride and 2-amino-8-hydroxy- | bluish-tinged red |

TABLE 1-continued

| Example No. | Diazo component | Coupling component | Color shade on cotton |
|---|---|---|---|
| | | naphthalene-3,6-disulfonic acid with 1 mole of 1,3-bis-aminomethyl-cyclohexane | |
| 163 | 2 moles of 2-aminonaphthalene-8-β-sulfatoethylsulfone | reaction product of 2 moles of the primary condensation product obtained from equimolar amounts of cyanuric chloride and 2-amino-8-hydroxy-naphthalene-3,6-disulfonic acid with 1 mole of 1,3-bis-aminomethyl-cyclohexane | red |
| 164 | 2 moles of 8-β-sulfatoethyl-sulfonyl-2-amino-naphthalene-6-sulfonic acid | reaction product of 2 moles of the primary condensation product obtained from equimolar amounts of cyanuric chloride and 2-amino-8-hydroxy-naphthalene-3,6-disulfonic acid with 1 mole of 1,3-bis-aminomethyl-cyclohexane | red |
| 165 | 2 moles of 6-β-sulfatoethyl-sulfonyl-2-amino-naphthalene-1-sulfonic acid | reaction product of 2 moles of the primary condensation product obtained from equimolar amounts of cyanuric chloride and 2-amino-8-hydroxy-naphthalene-3,6-disulfonic acid with 1 mole of 1,3-bis-aminomethyl-cyclohexane | red |
| 166 | 2 moles of aniline-4-β-sulfato-ethylsulfone | reaction product of 2 moles of the primary condensation product obtained from equimolar amounts of cyanuric chloride and 1-amino-8-hydroxy-naphthalene-4-sulfonic acid with 1 mole of 3,3'-dimethyl-4,4'-diamino-diphenyl-6,6'-disulfonic acid | red |
| 167 | 2 moles of aniline-3-β-sulfatoethylsulfone | reaction product of 2 moles of the primary condensation product obtained from equimolar amounts of cyanuric chloride and 1-amino-8-hydroxy-naphthalene-4-sulfonic acid with 1 mole of 3,3'-dimethyl-4,4'-diamino-diphenyl-6,6'-disulfonic acid | red |
| 168 | 2 moles of aniline-4-β-thiosulfatoethylsulfone | reaction product of 2 moles of the primary condensation product obtained from equimolar amounts of cyanuric chloride and 1-amino-8-hydroxy-naphthalene-4-sulfonic acid with 1 mole of 3,3'-dimethyl-4,4'-diamino-diphenyl-6,6'-disulfonic acid | red |
| 169 | 2 moles of aniline-3-vinyl-sulfone | reaction product of 2 moles of the primary condensation product obtained from equimolar amounts of cyanuric chloride and 1-amino-8-hydroxy-naphthalene-4-sulfonic acid with 1 mole of 3,3'-dimethyl-4,4'-diamino-diphenyl-6,6'-disulfonic acid | red |
| 170 | 2 moles of 2-aminoanisole-4-β-sulfatoethylsulfone | reaction product of 2 moles of the primary condensation product obtained from equimolar amounts of cyanuric chloride and 1-amino-8-hydroxy-naphthalene-4-sulfonic acid with 1 mole of 3,3'-dimethyl-4,4'-diamino-diphenyl-6,6'-disulfonic acid | red |
| 171 | 2 moles of 2-aminoanisole-4-β-thiosulfatoethylsulfone | reaction product of 2 moles of the primary condensation product obtained from equimolar amounts of cyanuric chloride and 1-amino-8-hydroxy-naphthalene-4-sulfonic acid with 1 mole of 3,3'-dimethyl-4,4'-diamino-diphenyl-6,6'-disulfonic acid | red |
| 172 | 2 moles of 2-aminoanisole-5-β-sulfatoethylsulfone | reaction product of 2 moles of the primary condensation product obtained from equimolar amounts of cyanuric chloride and 1-amino-8-hydroxy-naphthalene-4-sulfonic acid with 1 mole of 3,3'-dimethyl-4,4'-diamino-diphenyl-6,6'-disulfonic acid | red |
| 173 | 2 moles of 2,5-dimethoxyaniline-4-β-sulfatoethylsulfone | reaction product of 2 moles of the primary condensation product obtained from equimolar amounts of cyanuric chloride and 1-amino-8-hydroxy-naphthalene-4-sulfonic acid with 1 mole of 3,3'-dimethyl-4,4'-diamino-diphenyl-6,6'-disulfonic acid | red |

TABLE 1-continued

| Example No. | Diazo component | Coupling component | Color shade on cotton |
|---|---|---|---|
| 174 | 2 moles of 2-methoxy-5-methyl-aniline-4-β-sulfatoethylsulfone | reaction product of 2 moles of the primary condensation product obtained from equimolar amounts of cyanuric chloride and 1-amino-8-hydroxy-naphthalene-4-sulfonic acid with 1 mole of 3,3'-dimethyl-4,4'-diamino-diphenyl-6,6'-disulfonic acid | red |
| 175 | 2 moles of 8-β-sulfatoethyl-sulfonyl-2-aminonaphthalene-6-sulfonic acid | reaction product of 2 moles of the primary condensation product obtained from equimolar amounts of cyanuric chloride and 1-amino-8-hydroxy-naphthalene-4-sulfonic acid with 1 mole of 3,3'-dimethyl-4,4'-diamino-diphenyl-6,6'-disulfonic acid | red |
| 176 | 2 moles of 6-β-sulfatoethyl-sulfonyl-2-aminonaphthalene-1-sulfonic acid | reaction product of 2 moles of the primary condensation product obtained from equimolar amounts of cyanuric chloride and 1-amino-8-hydroxy-naphthalene-4-sulfonic acid with 1 mole of 3,3'-dimethyl-4,4'-diamino-diphenyl-6,6'-disulfonic acid | red |
| 177 | 2 moles of aniline-4-β-sulfatoethylsulfone | reaction product of 2 moles of the secondary condensation product obtained from equimolar amounts of cyanuric chloride, 1-amino-8-hydroxynaphthalene-3,6-disulfonic acid and ammonia with 1 mole of 4,4'-diaminostilbene-2,2'-disulfonic acid | red |
| 178 | 2 moles of aniline-3-β-sulfato-ethylsulfone | reaction product of 2 moles of the secondary condensation product obtained from equimolar amounts of cyanuric chloride, 1-amino-8-hydroxynaphthalene-3,6-disulfonic acid and ammonia with 1 mole of 4,4'-diaminostilbene-2,2'-disulfonic acid | red |
| 179 | 2 moles of 2-aminoanisole-4-β-sulfatoethylsulfone | reaction product of 2 moles of the secondary condensation product obtained from equimolar amounts of cyanuric chloride, 1-amino-8-hydroxynaphthalene-3,6-disulfonic acid and ammonia with 1 mole of 4,4'-diaminostilbene-2,2'-disulfonic acid | bluish-tinged red |
| 180 | 2 moles of aniline-β-thio-sulfatoethylsulfone | reaction product of 2 moles of the secondary condensation product obtained from equimolar amounts of cyanuric chloride, 1-amino-8-hydroxynaphthalene-3,6-disulfonic acid and ammonia with 1 mole of 4,4'-diaminostilbene-2,2'-disulfonic acid | red |
| 181 | 2 moles of aniline-4-vinyl-sulfone | reaction product of 2 moles of the secondary condensation product obtained from equimolar amounts of cyanuric chloride, 1-amino-8-hydroxynaphthalene-3,6-disulfonic acid and ammonia with 1 mole of 4,4'-diaminostilbene-2,2'-disulfonic acid | red |
| 182 | 2 moles of aniline-3-vinyl-sulfone | reaction product of 2 moles of the secondary condensation product obtained from equimolar amounts of cyanuric chloride, 1-amino-8-hydroxynaphthalene-3,6-disulfonic acid and ammonia with 1 mole of 4,4'-diaminostilbene-2,2'-disulfonic acid | red |
| 183 | 2 moles of 2-aminoanisole-4-β-thiosulfatoethylsulfone | reaction product of 2 moles of the primary condensation product obtained from equimolar amounts of cyanuric chloride and 1-amino-8-hydroxy-naphthalene-4,6-disulfonic acid with 1 mole of 1,4-diaminobenzene-3,6-disulfonic acid | red |
| 184 | 2 moles of 2,5-dimethoxy-aniline-4-β-sulfatoethylsulfone | reaction product of 2 moles of the primary condensation product obtained from equimolar amounts of cyanuric chloride and 1-amino-8-hydroxy-naphthalene-4,6-disulfonic acid with 1 mole of 1,4-diaminobenzene-3,6-disulfonic acid | claret |
| 185 | 2 moles of 2-methoxy-5-methyl-aniline-4-β-sulfatoethylsulfone | reaction product of 2 moles of the primary condensation product obtained from equimolar amounts of cyanuric | claret |

TABLE 1-continued

| Example No. | Diazo component | Coupling component | Color shade on cotton |
|---|---|---|---|
| | | chloride and 1-amino-8-hydroxy-naphthalene-4,6-disulfonic acid with 1 mole of 1,4-diaminobenzene-3,6-disulfonic acid | |
| 186 | 2 moles of 8-β-sulfatoethyl-sulfonyl-2-amino-naphthalene-6-sulfonic acid | reaction product of 2 moles of the primary condensation product obtained from equimolar amounts of cyanuric chloride and 1-amino-8-hydroxy-naphthalene-4,6-disulfonic acid with 1 mole of 1,4-diaminobenzene-3,6-disulfonic acid | bluish-tinged red |
| 187 | 2 moles of 6-β-sulfatoethyl-sulfonyl-2-amino-naphthalene-1-sulfonic acid | reaction product of 2 moles of the primary condensation product obtained from equimolar amounts of cyanuric chloride and 1-amino-8-hydroxy-naphthalene-4,6-disulfonic acid with 1 mole of 1,4-diaminobenzene-3,6-disulfonic acid | bluish-tinged red |
| 188 | 2 moles of aniline-4-β-sulfato-ethylsulfone | reaction product of 2 moles of the primary condensation product obtained from equimolar amounts of cyanuric chloride and 2-methylamino-5-hydroxy-naphthalene-7-sulfonic acid with 1 mole of di-(3-amino-4-sulfophenyl)-sulfone | orange |
| 189 | 2 moles of aniline-4-β-thio-sulfatoethylsulfone | reaction product of 2 moles of the primary condensation product obtained from equimolar amounts of cyanuric chloride and 2-methylamino-5-hydroxy-naphthalene-7-sulfonic acid with 1 mole of di-(3-amino-4-sulfophenyl)-sulfone | orange |
| 190 | 2 moles of aniline-3-β-sulfatoethylsulfone | reaction product of 2 moles of the primary condensation product obtained from equimolar amounts of cyanuric chloride and 2-methylamino-5-hydroxy-naphthalene-7-sulfonic acid with 1 mole of di-(3-amino-4-sulfophenyl)-sulfone | orange |
| 191 | 2 moles of 2-aminoanisole-4-β-sulfatoethylsulfone | reaction product of 2 moles of the primary condensation product obtained from equimolar amounts of cyanuric chloride and 2-methylamino-5-hydroxy-naphthalene-7-sulfonic acid with 1 mole of di-(3-amino-4-sulfophenyl)-sulfone | orange |
| 192 | 2 moles of 2-methoxy-5-methyl-aniline-4-β-sulfatoethylsulfone | reaction product of 2 moles of the primary condensation product obtained from equimolar amounts of cyanuric chloride and 2-methylamino-5-hydroxy-naphthalene-7-sulfonic acid with 1 mole of di-(3-amino-4-sulfophenyl)-sulfone | reddish-tinged orange |
| 193 | 2 moles of aniline-4-β-sulfato-ethylsulfone | reaction product of 2 moles of the primary condensation product obtained from equimolar amounts of cyanuric chloride and 1-amino-8-hydroxy-naphthalene-3,6-disulfonic acid with 1 mole of 4,4'-diamino-diphenyl-sulfone | red |
| 194 | 2 moles of 8-β-sulfatoethyl-sulfonyl-2-amino-naphthalene-6-sulfonic acid | reaction product of 2 moles of the primary condensation product obtained from equimolar amounts of cyanuric chloride and 1-amino-8-hydroxy-naphthalene-3,6-disulfonic acid with 1 mole of 4,4'-diamino-diphenyl-sulfone | bluish-tinged red |
| 195 | 2 moles of 6-β-sulfatoethyl-sulfonyl-2-amino-naphthalene-1-sulfonic acid | reaction product of 2 moles of the primary condensation product obtained from equimolar amounts of cyanuric chloride and 1-amino-8-hydroxy-naphthalene-3,6-disulfonic acid with 1 mole of 4,4'-diamino-diphenyl-sulfone | bluish-tinged red |
| 196 | 2 moles of 2,5-dimethoxy-aniline-4-β-sulfatoethyl-sulfone | reaction product of 2 moles of the primary condensation product obtained from equimolar amounts of cyanuric chloride and 1-amino-8-hydroxy-naphthalene-4,6-disulfonic acid with 1 mole of 4,4'-diamino-diphenylure-3,3'-disulfonic acid | claret |
| 197 | 2 moles of aniline-4-β-sulfatoethylsulfone | reaction product of 2 moles of the secondary condensation product obtained | red |

TABLE 1-continued

| Example No. | Diazo component | Coupling component | Color shade on cotton |
|---|---|---|---|
| | | from equimolar amounts of cyanuric chloride, 1-amino-8-hydroxynaphthalene-3,6-disulfonic acid and aniline-3-sulfonic acid with 1 mole of 2,2'-dichloro-4,4'-diaminodiphenyl | |
| 198 | 2 moles of 2-aminoanisole-4-β-thiosulfatoethylsulfone | reaction product of 2 moles of the secondary condensation product obtained from equimolar amounts of cyanuric chloride, 1-amino-8-hydroxynaphthalene-3,6-disulfonic acid and aniline-3-sulfonic acid with 1 mole of 2,2'-dichloro-4,4'-diaminodiphenyl | bluish-tinged red |
| 199 | 2 moles of aniline-3-vinylsulfone | reaction product of 2 moles of the secondary condensation product obtained from equimolar amounts of cyanuric chloride, 1-amino-8-hydroxynaphthalene-3,6-disulfonic acid and 2-amino-ethanol with 1 mole of 4,4'-diaminodiphenyl-3,3'-dicarboxylic acid | red |
| 200 | 2 moles of 2,6-dimethylaniline-4-β-sulfatoethylsulfone | reaction product of 2 moles of the secondary condensation product obtained from equimolar amounts of cyanuric chloride, 1-amino-8-hydroxynaphthalene-3,6-disulfonic acid and β-sulfatoethylamine with 1 mole of 2,7-diaminocarbazole | red |
| 201 | 2 moles of aniline-4-β-sulfatoethylsulfone | reaction product of 2 moles of the secondary condensation product obtained from equimolar amounts of cyanuric chloride, 1-amino-8-hydroxynaphthalene-3,6-disulfonic acid and isopropanol with 1 mole of 3-ethoxy-4,4'-diaminodiphenyl | red |
| 202 | 2 moles of aniline-3-β-sulfatoethylsulfone | reaction product of 2 moles of the secondary condensation product obtained from equimolar amounts of cyanuric chloride, 1-amino-8-hydroxynaphthalene-3,6-disulfonic acid and isopropanol with 1 mole of 3-ethoxy-4,4'-diaminodiphenyl | red |
| 203 | 2 moles of aniline-3-β-sulfatoethylsulfone | reaction product of 2 moles of the secondary condensation product obtained from equimolar amounts of cyanuric chloride, 1-amino-8-hydroxynaphthalene-4,6-disulfonic acid and thioglycollic acid with 1 mole of 3,3'-dichloro-4,4'-diamino-diphenyl | red |
| 204 | 2 moles of 2-aminoanisole-5-β-sulfatoethylsulfone | reaction product of 2 moles of the secondary condensation product obtained from equimolar amounts of cyanuric chloride, 1-amino-8-hydroxynaphthalene-4,6-disulfonic acid and thioglycollic acid with 1 mole of 3,3'-dichloro-4,4'-diamino-diphenyl | bluish-tinged red |
| 205 | 2 moles of 2-aminoanisole-4-β-sulfatoethylsulfone | reaction product of the secondary condensation product obtained from equimolar amounts of cyanuric chloride, 2-amino-5-hydroxynaphthalene-7-sulfonic acid and methyltaurine with 1 mole of 2,7-diaminodiphenylsulfone | orange |
| 206 | 2 moles of 2-aminotoluene-4-β-sulfatoethylsulfone | reaction product of 2 moles of the secondary condensation product obtained from equimolar amounts of cyanuric chloride, 2-amino-5-hydroxynaphthalene-7-sulfonic acid and methyltaurine with 1 mole of 2,7-diaminodiphenylsulfone | orange |
| 207 | 2 moles of 2-methoxy-5-methylaniline-4-β-sulfatoethylsulfone | reaction product of 2 moles of the secondary condensation product obtained from equimolar amounts of cyanuric chloride, 2-amino-8-hydroxynaphthalene-6-sulfonic acid and β-aminopropionic acid with 1 mole of 2,2'-dichloro-5,5'-dimethoxy-4,4'-diaminodiphenyl | red |
| 208 | 2 moles of 2,5-dimethoxyaniline-4-β-sulfatoethylsulfone | reaction product of 2 moles of the secondary condensation product obtained from equimolar amounts of cyanuric chloride, 1-amino-8-hydroxynaphthalene-3,6-disulfonic acid and β-methoxyethylamine with 1 mole of 2,2'-dimethoxy-5,5'-disulfo-4,4'-diamino-diphenylurea | claret |

TABLE 1-continued

| Example No. | Diazo component | Coupling component | Color shade on cotton |
|---|---|---|---|
| 209 | 2 moles of 2-chloroaniline-5-β-sulfatoethylsulfone | reaction product of 2 moles of the secondary condensation product obtained from equimolar amounts of cyanuric chloride, 1-amino-8-hydroxynaphthalene-3,6-disulfonic acid and β-methoxyethylamine with 1 mole of 2,2'-dimethoxy-5,5'-disulfo-4,4'-diamino-diphenylurea | red |
| 210 | 2 moles of 2,6-dimethylaniline-4-β-sulfatoethylsulfone | reaction product of 2 moles of the secondary condensation product obtained from equimolar amounts of cyanuric chloride, 1-amino-8-hydroxynaphthalene-4,6-disulfonic acid and aniline-N-methanesulfonic acid with 1 mole of benzidine | red |
| 211 | 2 moles of 2,6-dimethylaniline-3-β-sulfatoethylsulfone | reaction product of 2 moles of the secondary condensation product obtained from equimolar amounts of cyanuric chloride, 1-amino-8-hydroxynaphthalene-4,6-disulfonic acid and aniline-N-methanesulfonic acid with 1 mole of benzidine | red |
| 212 | 2 moles of 2,4-dimethoxyaniline-5-β-sulfatoethylsulfone | reaction product of 2 moles of the secondary condensation product obtained from equimolar amounts of cyanuric chloride, 1-amino-8-hydroxynaphthalene-3,6-disulfonic acid and p-aminobenzoic acid with 1 mole of 4,4'-diamino-diphenyl-sulfide-2,2'-disulfonic acid | claret |
| 213 | 2 moles of 2-aminoanisole-4-β-thiosulfatoethylsulfone | reaction product of 2 moles of the secondary condensation product obtained from equimolar amounts of cyanuric chloride, 1-amino-8-hydroxynaphthalene-3,6-disulfonic acid and p-aminobenzoic acid with 1 mole of 4,4'-diamino-diphenyl-sulfide-2,2'-disulfonic acid | bluish-tinged red |
| 214 | 2 moles of aniline-4-β-thiosulfatoethylsulfone | reaction product of 2 moles of the secondary condensation product obtained from equimolar amounts of cyanuric chloride, 1-amino-8-hydroxynaphthalene-3,6-disulfonic acid and aniline-2,5-disulfonic acid with 1 mole of 2,5-bis-(4'-aminophenyl)-1,3,4-oxadiazole | bluish-tinged red |
| 215 | 2 moles of 4-aminoanisole-2-β-sulfatoethylsulfone | reaction product of 2 moles of the secondary condensation product obtained from equimolar amounts of cyanuric chloride, 1-amino-8-hydroxynaphthalene-3,6-disulfonic acid and aniline-2,5-disulfonic acid with 1 mole of 2,5-bis-(4'-aminophenyl)-1,3,4-oxadiazole | bluish-tinged red |
| 216 | 2 moles of 4-β-sulfatoethylsulfonyl-aniline-2-sulfonic acid | reaction product of 2 moles of the secondary condensation product obtained from equimolar amounts of cyanuric chloride, 1-amino-8-hydroxynaphthalene-3,6-disulfonic acid and aniline-2,5-disulfonic acid with 1 mole of 2,5-bis-(4'-aminophenyl)-1,3,4-oxadiazole | red |
| 217 | 2 moles of 4-aminotoluene-2-β-sulfatoethylsulfone | reaction product of 2 moles of the primary condensation product obtained from equimolar amounts of cyanuric chloride and 1-amino-8-hydroxy-naphthalene-4,6-disulfonic acid with 1 mole of 4,4'-diamino-2-sulfo-diphenyl ether | red |
| 218 | 2 moles of 2-aminoanisole-4-vinyl-sulfone | reaction product of 2 moles of the primary condensation product obtained from equimolar amounts of cyanuric chloride and 1-amino-8-hydroxy-naphthalene-4,6-disulfonic acid with 1 mole of 4,4'-diamino-2-sulfo-diphenyl ether | bluish-tinged red |
| 219 | 2 moles of aniline-4-vinyl-sulfone | reaction product of 2 moles of the primary condensation product obtained from equimolar amounts of cyanuric chloride and 1-amino-8-hydroxy-naphthalene-3,6-disulfonic acid with 1 mole of 1,5-diaminonaphthalene | red |
| 220 | 2 moles of aniline-3-vinyl-sulfone | reaction product of 2 moles of the primary condensation product obtained from equimolar amounts of cyanuric | red |

/ TABLE 1-continued

| Example No. | Diazo component | Coupling component | Color shade on cotton |
|---|---|---|---|
| | | chloride and 1-amino-8-hydroxy-naphthalene-3,6-disulfonic acid with 1 mole of 1,5-diaminonaphthalene | |
| 221 | 2 moles of 2-bromoaniline-4-β-sulfatoethylsulfone | reaction product of 2 moles of the primary condensation product obtained from equimolar amounts of cyanuric chloride and 1-amino-8-hydroxy-naphthalene-3,6-disulfonic acid with 1 mole of 1,5-diaminonaphthalene | red |
| 222 | 2 moles of 2,6-dichloroaniline-4-β-sulfatoethylsulfone | reaction product of 2 moles of the primary condensation product obtained from equimolar amounts of cyanuric chloride and 1-amino-8-hydroxy-naphthalene-3,6-disulfonic acid with 1 mole of α,β-bis-(4-aminophenoxy)-ethane | red |
| 223 | 2 moles of 6-β-sulfatoethyl-sulfonyl-2-amino-naphthalene-1-sulfonic acid | reaction product of 2 moles of the primary condensation product obtained from equimolar amounts of cyanuric chloride and 1-amino-8-hydroxy-naphthalene-3,6-disulfonic acid with 1 mole of α,β-bis-(4-aminophenoxy)-ethane | bluish-tinged red |
| 224 | 2 moles of 2-naphthylamine-5-β-sulfatoethylsulfone | reaction product of 2 moles of the primary condensation product obtained from equimolar amounts of cyanuric chloride and 1-amino-8-hydroxy-naphthalene-3,6-disulfonic acid with 1 mole of α,β-bis-(4-aminophenoxy)-ethane | bluish-tinged red |
| 225 | 2 moles of 2-naphthylamine-8-β-sulfatoethylsulfone | reaction product of 2 moles of the primary condensation product obtained from equimolar amounts of cyanuric chloride and 1-amino-8-hydroxy-naphthalene-3,6-disulfonic acid with 1 mole of α,β-bis-(4-aminophenoxy)-ethane | bluish-tinged red |
| 226 | 2 moles of 2-naphthylamine-6-β-sulfatoethylsulfone | reaction product of 2 moles of the primary condensation product obtained from equimolar amounts of cyanuric chloride and 1-amino-8-hydroxy-naphthalene-3,6-disulfonic acid with 1 mole of α,β-bis-(4-aminophenoxy)-ethane | bluish-tinged red |
| 227 | 2 moles of 2-chloroaniline-4-β-sulfatoethylsulfone | reaction product of 2 moles of the primary condensation product obtained from equimolar amounts of cyanuric chloride and 1-amino-8-hydroxy-naphthalene-3,6-disulfonic acid with 1 mole of α,β-bis-(4-aminophenoxy)-ethane | red |
| 228 | 2 moles of 2-amino-4-β-sulfato-ethylsulfonyl-benzoic acid | reaction product of 2 moles of the primary condensation product obtained from equimolar amounts of cyanuric chloride and 1-amino-8-hydroxy-naphthalene-3,6-disulfonic acid with 1 mole of α,β-bis-(4-aminophenoxy)-ethane | red |
| 229 | 2 moles of 5-β-sulfatoethyl-sulfonyl-aniline-2-sulfonic acid | reaction product of 2 moles of the primary condensation product obtained from equimolar amounts of cyanuric chloride and 1-amino-8-hydroxy-naphthalene-3,6-disulfonic acid with 1 mole of α,β-bis-(4-aminophenoxy)-ethane | red |
| 230 | 2 moles of aniline-4-β-sulfatoethylsulfone | reaction product of 1 mole of the primary condensation product obtained from equimolar amounts of cyanuric chloride and 1-amino-8-hydroxy-naphthalene-3,6-disulfonic acid and 1 mole of the primary condensation product obtained from equimolar amounts of cyanuric chloride and 1-amino-8-hydroxynaphthalene-4,6-disulfonic acid with 1 mole of 4,4'-diamino-diphenylamine-3-sulfonic acid | red |
| 231 | 2 moles of aniline-3-β-sulfatoethylsulfone | reaction product of 1 mole of the primary condensation product obtained from equimolar amounts of cyanuric | yellowish-tinged red |

TABLE 1-continued

| Example No. | Diazo component | Coupling component | Color shade on cotton |
|---|---|---|---|
| | | chloride and 1-amino-8-hydroxy-naphthalene-3,6-disulfonic acid and 1 mole of the primary condensation product obtained from equimolar amounts of cyanuric chloride and 2-amino-5-naphthol-7-sulfonic acid with 1 mole of 1,4-diamino-2-methoxybenzene-5-sulfonic acid | |
| 232 | 2 moles of aniline-4-β-thiosulfatoethylsulfone | reaction product of 1 mole of the primary condensation product obtained from equimolar amounts of cyanuric chloride and 1-amino-8-hydroxy-naphthalene-3,6-disulfonic acid and 1 mole of the primary condensation product obtained from equimolar amounts of cyanuric chloride and 2-amino-8-naphthol-6-sulfonic acid with 1 mole of 1,3-diamino-4-methoxybenzene | red |
| 233 | 2 moles of aniline-4-vinyl-sulfone | reaction product of 1 mole of the primary condensation product obtained from equimolar amounts of cyanuric chloride and 1-amino-8-hydroxynaphthalene-3,6-disulfonic acid and 1 mole of the primary condensation product obtained from equimolar amounts of cyanuric chloride and 2-amino-8-naphthol-6-sulfonic acid with 1 mole of 1,3-diamino-4-methoxybenzene | red |
| 234 | 2 moles of 2-aminoanisole-4-β-sulfatoethylsulfone | reaction product of 1 mole of the primary condensation product obtained from equimolar amounts of cyanuric chloride and 1-amino-8-hydroxynaphthalene-3,6-disulfonic acid and 1 mole of the primary condensation product obtained from equimolar amounts of cyanuric chloride and 2-amino-8-hydroxynaphthalene-6-sulfonic acid with 1 mole of 1,4-diamino-benzene-3-sulfonic acid | red |
| 235 | 2 moles of 2-methoxy-5-methyl-aniline-4-β-sulfatoethyl-sulfone | reaction product of 1 mole of the primary condensation product obtained from equimolar amounts of cyanuric chloride and 1-amino-8-hydroxynaphthalene-3,6-disulfonic acid and 1 mole of the primary condensation product obtained from equimolar amounts of cyanuric chloride and 2-amino-8-hydroxynaphthalene-6-sulfonic acid with 1 mole of 1,4-diamino-benzene-3-sulfonic acid | bluish-tinged red |
| 236 | 2 moles of 2,5-dimethoxy-aniline-4-β-sulfatoethyl-sulfone | reaction product of 1 mole of the primary condensation product obtained from equimolar amounts of cyanuric chloride and 1-amino-8-hydroxynaphthalene-3,6-disulfonic acid and 1 mole of the primary condensation product obtained from equimolar amounts of cyanuric chloride and 2-amino-8-hydroxynaphthalene-6-sulfonic acid with 1 mole of 1,4-diamino-benzene-3-sulfonic acid | bluish-tinged red |
| 237 | 2 moles of 8-β-sulfatoethyl-sulfonyl-2-amino-naphthalene-6-sulfonic acid | reaction product of 1 mole of the primary condensation product obtained from equimolar amounts of cyanuric chloride and 1-amino-8-hydroxynaphthalene-3,6-disulfonic acid and 1 mole of the primary condensation product obtained from equimolar amounts of cyanuric chloride and 2-amino-8-hydroxynaphthalene-6-sulfonic acid with 1 mole of 1,4-diamino-benzene-3-sulfonic acid | bluish-tinged red |
| 238 | 2 moles of 6-β-sulfatoethyl-sulfonyl-2-amino-naphthalene-1-sulfonic acid | reaction product of 1 mole of the primary condensation product obtained from equimolar amounts of cyanuric chloride and 1-amino-8-hydroxy-naphthalene-3,6-disulfonic acid and 1 mole of the primary condensation product obtained from equimolar amounts of cyanuric chloride and 2-amino-8-hydroxynaphthalene-6-sulfonic acid with 1 mole of 1,4-diaminobenzene-3-sulfonic acid | bluish-tinged red |
| 239 | 2 moles of 2-naphthylamine-6-β-sulfatoethylsulfone | reaction product of 1 mole of the primary condensation product obtained | bluish-tinged red |

TABLE 1-continued

| Example No. | Diazo component | Coupling component | Color shade on cotton |
|---|---|---|---|
| | | from equimolar amounts of cyanuric chloride and 1-amino-8-hydroxy-naphthalene-3,6-disulfonic acid and 1 mole of the primary condensation product obtained from equimolar amounts of cyanuric chloride and 2-amino-8-hydroxynaphthalene-6-sulfonic acid with 1 mole of 1,4-diaminobenzene-3-sulfonic acid | |
| 240 | 2 moles of 2-naphthylamine-8-β-sulfatoethylsulfone | reaction product of 1 mole of the primary condensation product obtained from equimolar amounts of cyanuric chloride and 1-amino-8-hydroxy-naphthalene-3,6-disulfonic acid and 1 mole of the primary condensation product obtained from equimolar amounts of cyanuric chloride and 2-amino-8-hydroxynaphthalene-6-sulfonic acid with 1 mole of 1,4-diaminobenzene-3-sulfonic acid | bluish-tinged red |
| 241 | 2 moles of 2-naphthylamine-5-β-sulfatoethylsulfone | reaction product of 1 mole of the primary condensation product obtained from equimolar amounts of cyanuric chloride and 1-amino-8-hydroxy-naphthalene-3,6-disulfonic acid and 1 mole of the primary condensation product obtained from equimolar amounts of cyanuric chloride and 2-amino-8-hydroxynaphthalene-6-sulfonic acid with 1 mole of 1,4-diaminobenzene-3-sulfonic acid | bluish-tinged red |
| 242 | 2 moles of aniline-4-β-sulfatoethylsulfone | reaction product of 1 mole of the primary condensation product obtained from equimolar amounts of cyanuric chloride and 1-amino-8-hydroxy-naphthalene-4,6-disulfonic acid and 1 mole of the primary condensation product obtained from equimolar amounts of cyanuric chloride and 2-amino-8-hydroxynaphthalene-6-sulfonic acid with 1 mole of 1,3-diaminobenzene-4-sulfonic acid | red |
| 243 | 2 moles of aniline-3-β-sulfatoethylsulfone | reaction product of 1 mole of the primary condensation product obtained from equimolar amounts of cyanuric chloride and 1-amino-8-hydroxy-naphthalene-4,6-disulfonic acid and 1 mole of the primary condensation product obtained from equimolar amounts of cyanuric chloride and 2-amino-8-hydroxynaphthalene-6-sulfonic acid with 1 mole of 1,3-diaminobenzene-1-sulfonic acid | red |
| 244 | 2 moles of aniline-4-vinylsulfone | reaction product of 1 mole of the primary condensation product obtained from equimolar amounts of cyanuric chloride and 2-amino-8-hydroxy-naphthalene-6-sulfonic acid and 1 mole of the primary condensation product obtained from equimolar amounts of cyanuric chloride and 2-amino-5-naphthol-7-sulfonic acid with 1 mole of 1,4-diaminobenzene-3-sulfonic acid | orange |
| 245 | 2 moles of aniline-4-β-thiosulfatoethylsulfone | reaction product of 1 mole of the primary condensation product obtained from equimolar amounts of cyanuric chloride and 2-amino-8-hydroxy-naphthalene-6-sulfonic acid and 1 mole of the primary condensation product obtained from equimolar amounts of cyanuric chloride and 2-amino-5-naphthol-7-sulfonic acid with 1 mole of 1,4-diaminobenzene-3-sulfonic acid | orange |
| 246 | 2 moles of 2-aminoanisole-4-β-sulfatoethylsulfone | reaction product of 1 mole of the primary condensation product obtained from equimolar amounts of cyanuric chloride and 2-amino-8-hydroxy-naphthalene-6-sulfonic acid and 1 mole of the primary condensation product obtained from equimolar amounts | orange |

TABLE 1-continued

| Example No. | Diazo component | Coupling component | Color shade on cotton |
|---|---|---|---|
| 247 | 2 moles of aniline-3-vinyl-sulfone | of cyanuric chloride and 2-amino-5-naphthol-7-sulfonic acid with 1 mole of 1,4-diaminobenzene-3-sulfonic acid reaction product of 2 moles of the primary condensation product obtained from equimolar amounts of cyanuric chloride and 1-amino-8-hydroxy-naphthalene-3,6-disulfonic acid with 1 mole of 4,4'-diaminoazobenzene | red |
| 248 | 2 moles of 2-aminoanisole-4-β-thiosulfatoethylsulfone | reaction product of 2 moles of the primary condensation product obtained from equimolar amounts of cyanuric chloride and 1-amino-8-hydroxy-naphthalene-3,6-disulfonic acid with 1 mole of 4,4'-diaminoazobenzene | claret |
| 249 | 2 moles of 2,5-dimethoxy-aniline-4-β-sulfatoethyl-sulfone | reaction product of 2 moles of the primary condensation product obtained from equimolar amounts of cyanuric chloride and 2-methylamino-8-naphthol-6-sulfonic acid with 1 mole of 4,4'-diaminodiphenylmethane | red |
| 250 | 2 moles of 2-methoxy-5-methyl-aniline-4-β-sulfatoethyl-sulfone | reaction product of 2 moles of the primary condensation product obtained from equimolar amounts of cyanuric chloride and 1-amino-8-hydroxy-naphthalene-3,6-disulfonic acid with 1 mole of 1,2-bis-(4'-aminophenyl)-ethane | claret |

EXAMPLE 251

18.5 parts by weight of cyanuric chloride are dissolved in 60 parts by volume of acetone, with warming, and the solution is then poured into 500 parts by volume of water at 15°-20° C. A neutral solution of 31.9 parts by weight of 1-amino-8-naphthol-3,6-disulfonic acid and 8.5 parts by volume of aqueous 33% sodium hydroxide solution in 150 parts by volume of water is then added immediately and the resulting mixture is stirred for some time. A neutral solution of 18.5 parts by weight of 4,4'-diaminostilbene-2,2'-disulfonic acid and 9 parts by volume of aqueous 33% sodium hydroxide solution in 250 parts by volume of water and, immediately thereafter, 30 parts by weight of crystalline sodium acetate are added and the resulting mixture is stirred for several hours at 20°-30° C. The suspension of the coupling component which is thus obtained is combined with the following diazonium salt solution: 29.7 parts by weight of 4-β-sulfatoethylsulfonyl-2-aminophenol are suspended in 140 parts by volume of water and 60 parts by weight of ice and dissolved to give a neutral solution by adding 7.6 parts by weight of sodium carbonate. 20.5 parts by volume of aqueous 5 N sodium nitrite solution are added and the solution thus obtained is added dropwise to a mixture of 25 parts by volume of aqueous 31% hydrochloric acid and 150 parts by weight of ice. The pH value is adjusted to 5.5-6.5 by adding 13 parts by weight of sodium bicarbonate in portions, and the suspension of the coupling component described initially is then added. The coupling reaction is carried out for several hours at 22°-24° C., the pH value being kept at 6.0 by adding a total of 19.5 parts by weight of sodium bicarbonate in portions. After the formation of the dyestuff has ended, the mixture is warmed to about 80° C. and the dyestuff solution is clarified. The solution is allowed to cool to 50° C. and 30 parts by weight of crystalline sodium acetate and 24.7 parts by weight of crystalline copper sulfate are added and the mixture is stirred for one hour at 50°-55° C. The dyestuff is precipitated by adding 25%, based on the volume, of potassium chloride, filtered off, dried in vacuo at 60° C. and ground. This gives a brown-black dyestuff powder which gives reddish-tinged violet dyeings and prints of considerable depth of shade on cotton when the processes customary for reactive dyestuffs are used. The dyestuff has the following constitution:

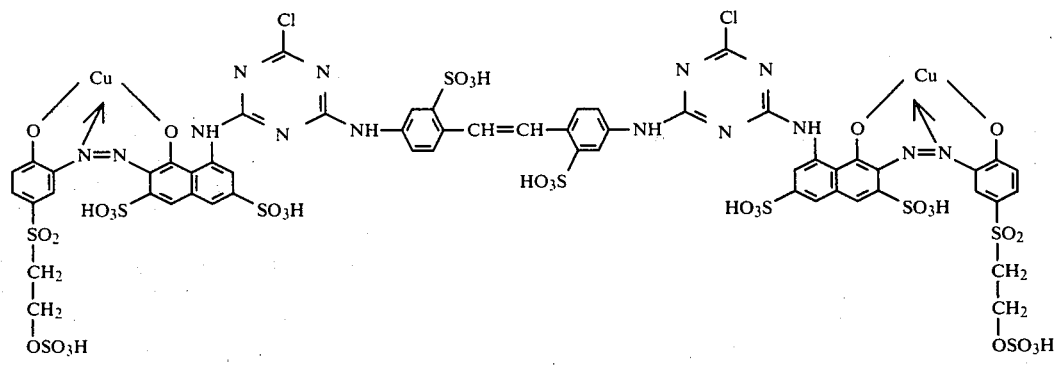

EXAMPLE 252

If the corresponding amount of 5-β-sulfatoethylsulfonyl-2-aminophenol is employed in place of the 4-β-sulfatoethylsulfonyl-2-aminophenol in Example 251 and in other respects the procedure is as indicated in Example 251, this gives a dark brown dyestuff powder with which deep violet dyeings with very good general fastness properties are obtained on cellulose materials. In the form of the free acid, the dyestuff has the following constitution:

adding 120 parts by weight of calcium carbonate and the solution is added to the abovementioned suspension of the coupling component.

After the diazonium salt solution has been added, the mixture is stirred for 16 hours at room temperature, the pH value being kept at 5.5–6.0 by adding about 10.1 parts by weight of calcium carbonate in portions. The mixture is then warmed to 60°–70° C. and the gypsum is filtered off. The latter is washed with hot water, and 30 parts by weight of crystalline sodium acetate and 24.7 parts by weight of crystalline copper sulfate are then

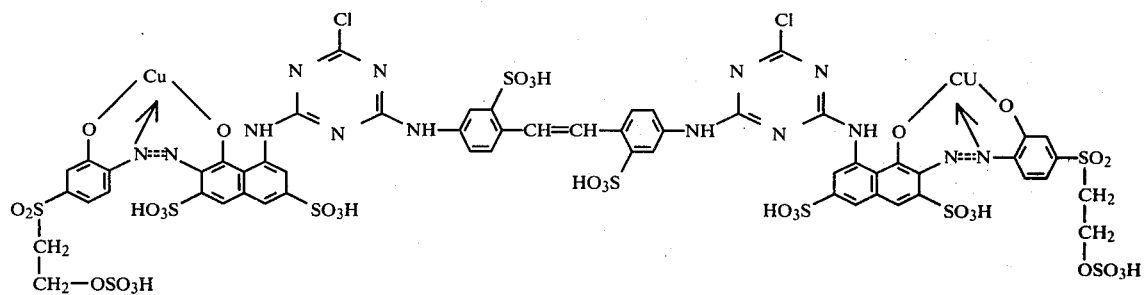

EXAMPLE 253

The reaction product of 18.5 parts by weight of 4,4'-diaminostilbene-2,2'-disulfonic acid with the primary condensation product of 31.9 parts by weight of 1-amino-8-hydroxynaphthalene-3,6-disulfonic acid and 18.5 parts by weight of cyanuric chloride is prepared in the manner described in Example 251. The suspension of this coupling component is combined with the following diazonium salt solution:

added to the filtrate and a mixture of 22.7 parts by weight of 30% strength hydrogen peroxide and 100 parts by volume of water is added dropwise at 32°–38° C. in the course of 30 minutes. After 3 hours, the dyestuff solution is clarified and the dyestuff is precipitated by adding potassium chloride, filtered off and dried in vacuo at 60° C. This gives a dark blue powder which gives reddish-tinged blue prints and dyeings on cotton fabric. In the form of the free acid, the dyestuff has the following constitution:

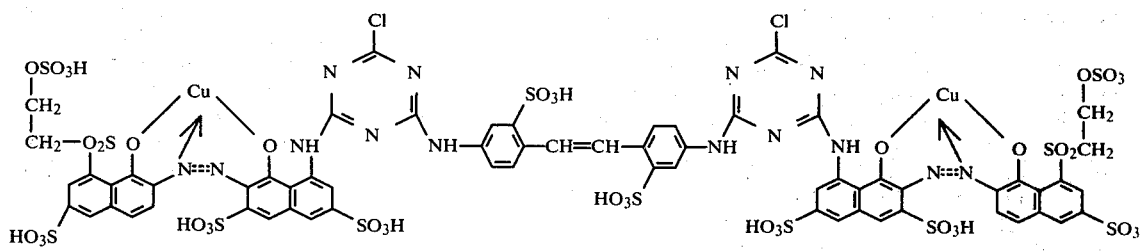

25.1 parts by weight of 2-aminonaphthalene-8-β-hydroxyethylsulfone are introduced into 66 parts by volume of 20% strength oleum in the course of about 20 minutes and the mixture is then warmed at 65°–70° C. for 4 hours. The reaction mixture is then cooled to 25°–30° C. and is allowed to run into a mixture of 250 parts by weight of ice and 100 parts by volume of water. The diazotization is then carried out at 0°–5° C. with 20 parts by volume of aqueous 5 N sodium nitrite solution, the reaction mixture is stirred for a further one hour at this temperature and then a little excess nitrous acid is destroyed by means of amidosulfonic acid. The pH of the diazonium salt solution is adjusted to 5.0–5.5 by

EXAMPLE 253a

The non-metallized dyestuff is prepared as described in Example 251. After clarifying, 30 parts by weight of crystalline sodium acetate and 29.5 parts by weight of crystalline cobalt sulfate are added to the filtrate and the mixture is then warmed at 60°–65° C. for 2 hours. The dyestuff solution is clarified and then evaporated to dryness in vacuo. This gives a dark dyestuff powder with which opaque violet prints can be produced on cotton in the presence of acid-binding agents. In the form of the free acid, the dyestuff has the following constitution:

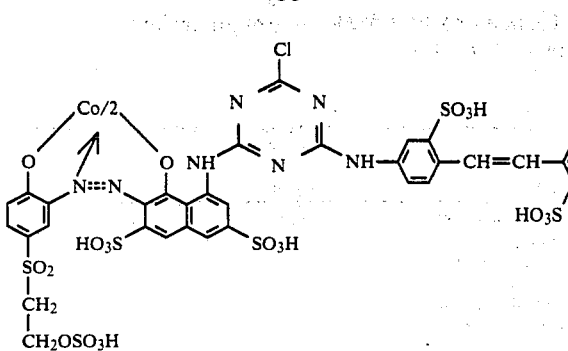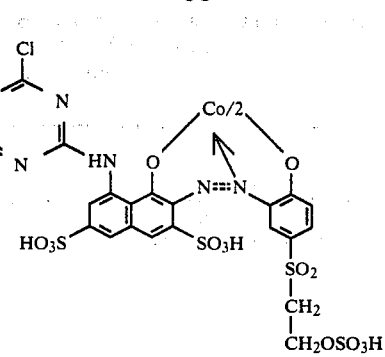

EXAMPLE 254

The non-metallized dyestuff is prepared as described in Example 251. After clarifying, the filtrate is warmed to 50°-55° C. and, at this temperature, 32 parts by weight of crystalline sodium acetate and 25 parts by weight of chromium-potassium sulfate are added. The temperature is then raised to the boiling point and the mixture is boiled under reflux for 5 hours. Thereafter, the dyestuff solution is clarified and then evaporated to dryness in vacuo at 60° C. This gives a grey-black dyestuff powder with which reddish-tinged grey prints are obtained on cotton fabric in the presence of acid-binding agents. In the form of the free acid, the dyestuff has the following constitution:

After stirring for one hour at 0°-5° C., a little excess nitrous acid is destroyed with amidosulfonic acid and the pH of the resulting diazonium salt solution is then adjusted to 6 by introducing about 4 parts by weight of sodium bicarbonate. This solution is combined with the coupling solution described in Example 251. The coupling reaction is carried out at 18°-20° C. for several hours, the pH value being kept at 5.3-6.1 by adding sodium bicarbonate in portions. When the coupling has ended, a solution of 34.6 parts by weight of crystalline copper sulfate, 48.3 parts by weight of crystalline sodium acetate and 31.8 parts by weight of glacial acetic acid in 147.5 parts by volume of water is added and the resulting mixture is then boiled under reflux for 18 hours. After cooling, the dyestuff solution is clarified

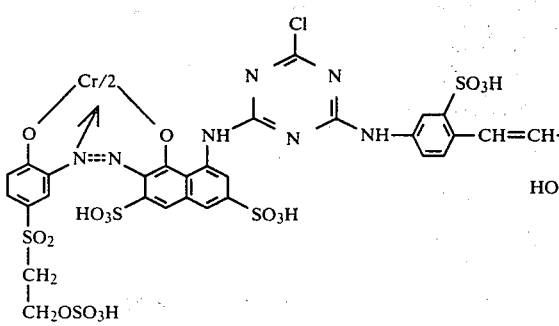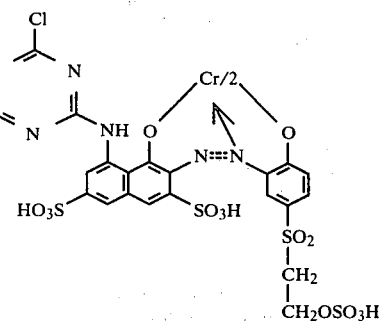

EXAMPLE 255

32.5 parts by weight of 2-methoxy-5-methylaniline-4-β-sulfatoethylsulfone are suspended in 150 parts by volume of water and 50 parts by weight of ice and dissolved by adding about 6.3 parts by weight of calcined sodium carbonate, the pH value being between 6.0 and 6.5. 20.3 parts by volume of aqueous 5 N sodium nitrite solution and 1.5 parts by weight of kieselguhr are added and the solution is clarified. The filtrate runs at 0°-5° C. into a mixture of 150 parts by weight of ice and 28.2 parts by weight of aqueous 31% hydrochloric acid.

and the dyestuff is then precipitated by adding potassium chloride, filtered off and dried in vacuo at 60° C. This gives a blue-black powder which in the presence of acid-binding agents dyes cellulose materials in reddish-tinged blue shades. In the form of the free acid, the dyestuff has the following constitution:

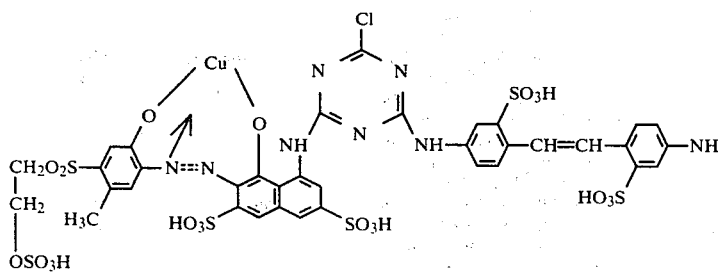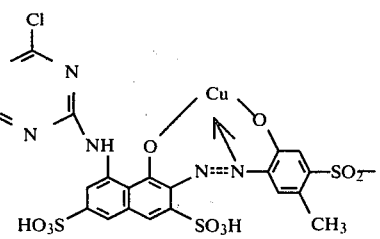

The heavy metal complex dyestuffs listed in the table which follows can be obtained in a manner similar to that described in Examples 251 to 255. In the "diazo component" column, the said components are indicated in the form in which they are present after metallization, that is to say in some cases with a hydroxyl group formed from a methoxy group by demethylating metallization or with a hydroxy group introduced by oxidative coppering.

TABLE 2

| Example No. | Diazo component | Coupling component | Complex-forming metal | Color shade on cotton |
|---|---|---|---|---|
| 256 | 2 moles of 2-aminophenol-5-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 4,4'-diamino-stilbene-2,2'-disulfonic acid | chromium | bluish-tinged grey |
| 257 | 2 moles of 2-aminophenol-5-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 4,4'-diamino-stilbene-2,2'disulfonic acid | cobalt | violet-tinged grey |
| 258 | 2 moles of 6-bromo-2-aminophenol-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 4,4'-diamino-stilbene-2,2'-disulfonic acid | copper | violet |
| 259 | 2 moles of 6-bromo-2-aminophenol-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 4,4'-diamino-stilbene-2,2'-disulfonic acid | chromium | reddish-tinged grey |
| 260 | 2 moles of 6-bromo-2-aminophenol-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 4,4'-diamino-stilbene-2,2'-disulfonic acid | cobalt | opaque violet |
| 261 | 2 moles of b-nitro-2-amino phenol-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 4,4'-diamino-stilbene-2,2'-disulfonic acid | copper | violet |
| 262 | 2 moles of 6-nitro-2-aminophenol-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 4,4'-diamino-stilbene-2,2'-disulfonic acid | chromium | grey |
| 263 | 2 moles of 6-nitro-2-aminophenol-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 4,4'-diamino-stilbene-2,2'-disulfonic acid | cobalt | grey |
| 264 | 2 moles of 4-methyl-2-aminophenol-5-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 4,4'-diamino-stilbene-2,2'-disulfonic acid | chromium | bluish-tinged grey |
| 265 | 2 moles of 4-methyl-2-aminophenol-5-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 4,4'-diamino-stilbene-2,2'-disulfonic acid | cobalt | violet-tinged grey |
| 266 | 2 moles of 4-methoxy-2-aminophenol-5-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 4,4'-diamino- | copper | reddish-tinged blue |

TABLE 2-continued

| Example No. | Diazo component | Coupling component | Complex-forming metal | Color shade on cotton |
|---|---|---|---|---|
| 267 | 2 moles of 4-β-sulfatoethyl-sulfonyl-2-aminophenol-6-sulfonic acid | stilbene-2,2'-disulfonic acid reaction product of 2 moles of the primary condensation product obtained from equimolar amounts of cyanuric chloride and 1-amino-8-hydroxynaphthalene-3,6-disulfonic acid with 1 mole of 4,4'-diamino-stilbene-2,2'-disulfonic acid | copper | violet |
| 268 | 2 moles of 4-β-sulfatoethyl-sulfonyl-2-aminophenol-6-sulfonic acid | reaction product of 2 moles of the primary condensation product obtained from equimolar amounts of cyanuric chloride and 1-amino-8-hydroxynaphthalene-3,6-disulfonic acid with 1 mole of 4,4'-diamino-stilbene-2,2'-disulfonic acid | chromium | reddish-tinged grey |
| 269 | 2 moles of 4-β-sulfatoethyl-sulfonyl-2-aminophenol-6-sulfonic acid | reaction product of 2 moles of the primary condensation product obtained from equimolar amounts of cyanuric chloride and 1-amino-8-hydroxynaphthalene-3,6-disulfonic acid with 1 mole of 4,4'-diamino-stilbene-2,2'-disulfonic acid | cobalt | opaque violet |
| 270 | 2 moles of 8-β-sulfatoethyl-sulfonyl-1-hydroxy-2-amino-naphthalene-6-sulfonic acid | reaction product of 2 moles of the primary condensation product obtained from equimolar amounts of cyanuric chloride and 1-amino-8-hydroxynaphthalene-3,6-disulfonic acid with 1 mole of 4,4'-diamino-stilbene-2,2'-disulfonic acid | copper | reddish-tinged blue |
| 271 | 2 moles of 2-aminophenol-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 3,3'-dimethyl-benzidine-6,6'-disulfonic acid | copper | violet |
| 272 | 2 moles of 2-aminophenol-4-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 3,3'-dimethyl-benzidine-6,6'-disulfonic acid | chromium | reddish-tinged grey |
| 273 | 2 moles of 2-aminophenol-4-β-sulfatoethylfulfone | reaction product of 2 moles of the primary condensation product obtained from equimolar amounts of cyanuric chloride and 1-amino-8-hydroxynaphthalene-3,6-disulfonic acid with 1 mole of 3,3'-dimethyl-benzidine-6,6'-disulfonic acid | cobalt | opaque violet |
| 274 | 2 moles of 2-aminophenol-5-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 3,3'-dimethyl-benzidine-6,6'-disulfonic acid | copper | violet |
| 275 | 2 moles of 2-aminophenol-5-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 3,3'-dimethyl-benzidine-6,6'-disulfonic acid | chromium | bluish-tinged grey |
| 276 | 2 moles of 2-aminophenol-5-β-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 3,3'-dimethyl-benzidine-6,6'-disulfonic acid | cobalt | violet-tinged grey |
| 277 | 2 moles of 6-chloro-2-amino-phenol-4-β-sulfatoethyl- | reaction product of 2 moles of the primary condensation product | copper | violet |

TABLE 2-continued

| Example No. | Diazo component | Coupling component | Complex-forming metal | Color shade on cotton |
|---|---|---|---|---|
| | sulfone | obtained from equimolar amounts of cyanuric chloride and 1-amino-8-hydroxynaphthalene-3,6-disulfonic acid with 1 mole of 3,3'-dimethyl-benzidine-6,6'-disulfonic acid | | |
| 278 | 2 moles of 6-chloro-2-aminophenol-4-$\beta$-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 3,3'-dimethyl-benzidine-6,6'-disulfonic acid | chromium | reddish-tinged grey |
| 279 | 2 moles of 6-chloro-2-aminophenol-4-$\beta$-sulfatoethylsulfone | reaction product of 2 moles of the primary condensation product obtained from equimolar amounts of cyanuric chloride and 1-amino-8-hydroxynaphthalene-3,6-disulfonic acid with 1 mole of 3,3'-dimethyl-benzidine-6,6'-disulfonic acid | cobalt | opaque violet |
| 280 | 2 moles of 2-aminophenol-4-$\beta$-sulfatoethylsulfone | reaction product of 2 moles of the primary condensation product obtained from equimolar amounts of cyanuric chloride and 1-amino-8-naphthol-3,6-disulfonic acid with 1 mole of 1,6-diaminohexane | copper | violet |
| 281 | 2 moles of 2-aminophenol-4-$\beta$-sulfatoethylsulfone | reaction product of 2 moles of the primary condensation product obtained from equimolar amounts of cyanuric chloride and 1-amino-8-naphthol-3,6-disulfonic acid with 1 mole of 1,6-diaminohexane | chromium | reddish-tinged grey |
| 282 | 2 moles of 2-aminophenol-4-$\beta$-sulfatoethylsulfone | reaction product of 2 moles of the primary condensation product obtained from equimolar amounts of cyanuric chloride and 1-amino-8-naphthol-3,6-disulfonic acid with 1 mole of 1,6-diaminohexane | cobalt | violet |
| 283 | 2 moles of 2-aminophenol-5-$\beta$-sulfatoethylsulfone | reaction product of 2 moles of the primary condensation product obtained from equimolar amounts of cyanuric chloride and 1-amino-8-naphthol-3,6-disulfonic acid with 1 mole of 1,6-diaminohexane | copper | violet |
| 284 | 2 moles of 2-aminophenol-5-$\beta$-sulfatoethylsulfone | reaction product of 2 moles of the primary condensation product obtained from equimolar amounts of cyanuric chloride and 1-amino-8-naphthol-3,6-disulfonic acid with 1 mole of 1,6-diaminohexane | chromium | bluish-tinged grey |
| 285 | 2 moles of 2-aminophenol-5-$\beta$-sulfatoethylsulfone | reaction product of 2 moles of the primary condensation product obtained from equimolar amounts of cyanuric chloride and 1-amino-8-naphthol-3,6-disulfonic acid with 1 mole of 1,6-diaminohexane | cobalt | violet-tinged grey |
| 286 | 2 moles of 8-$\beta$-sulfatoethylsulfonyl-1-hydroxy-2-amino-naphthalene-6-sulfonic acid | reaction product of 2 moles of the primary condensation product obtained from equimolar amounts of cyanuric chloride and 1-amino-8-naphthol-3,6-disulfonic acid with 1 mole of 1,6-diaminohexane | copper | reddish-tinged blue |
| 287 | 2 moles of 2-aminophenol-4-$\beta$-sulfatoethylsulfone | reaction product of 2 moles of the primary condensation product obtained from equimolar amounts of cyanuric chloride and 1-amino-8-naphthol-3,6-disulfonic acid with 1 mole of di-(3-amino-4-sulfophenyl)-sulfone | copper | violet |
| 288 | 2 moles of 2-aminophenol-4-$\beta$-sulfatoethylsulfone | reaction product of 2 moles of the primary condensation product obtained from equimolar amounts of cyanuric chloride and 1-amino-8-naphthol-3,6-disulfonic acid with 1 mole of di-(3-amino-4-sulfophenyl)-sulfone | chromium | reddish-tinged grey |
| 289 | 2 moles of 2-aminophenol- | reaction product of 1 mole of the | cobalt | opaque violet |

TABLE 2-continued

| Example No. | Diazo component | Coupling component | Complex-forming metal | Color shade on cotton |
|---|---|---|---|---|
| | 4-β-sulfatoethylsulfone | primary condensation product obtained from equimolar amounts of cyanuric chloride and 1-amino-8-naphthol-3,6-disulfonic acid with 1 mole of the primary condensation product obtained from equimolar amounts of cyanuric chloride and 6-amino-2-naphthol-4-sulfonic acid with 1 mole of 1,4-diaminobenzene-2-sulfonic acid | | |
| 290 | 2 moles of 2-aminophenol-5-β-sulfatoethylsulfone | reaction product of 1 mole of the primary condensation product obtained from equimolar amounts of cyanuric chloride and 1-amino-8-naphthol-3,6-disulfonic acid with 1 mole of the primary condensation product obtained from equimolar amounts of cyanuric chloride and 6-amino-2-naphthol-4-sulfonic acid with 1 mole of 1,4-diaminobenzene-2-sulfonic acid | copper | violet |
| 291 | 2 moles of 2-aminophenol-5-β-sulfatoethylsulfone | reaction product of 1 mole of the primary condensation product obtained from equimolar amounts of cyanuric chloride and 1-amino-8-naphthol-3,6-disulfonic acid with 1 mole of the primary condensation product obtained from equimolar amounts of cyanuric chloride and 6-amino-2-naphthol-4-sulfonic acid with 1 mole of 1,4-diaminobenzene-2-sulfonic acid | chromium | bluish-tinged grey |
| 292 | 2 moles of 2-aminophenol-5-β-sulfatoethylsulfone | reaction product of 1 mole of the primary condensation product obtained from equimolar amounts of cyanuric chloride and 1-amino-8-naphthol-3,6-disulfonic acid with 1 mole of the primary condensation product obtained from equimolar amounts of cyanuric chloride and 6-amino-2-naphthol-4-sulfonic acid with 1 mole of 1,4-diaminobenzene-2-sulfonic acid | cobalt | violet-tinged grey |
| 293 | 2 moles of 2-aminophenol-4-β-sulfatoethylsulfone | reaction product of 1 mole of the primary condensation product obtained from equimolar amounts of cyanuric chloride and 1-amino-8-naphthol-3,6-disulfonic acid, 1 mole of the primary condensation product obtained from equimolar amounts of cyanuric chloride and 2-amino-8-naphthol-6-sulfonic acid with 1 mole of 1,3-diaminobenzene-4-sulfonic acid | copper | violet |
| 294 | 2 moles of 2-aminophenol-4-β-sulfatoethylsulfone | reaction product of 1 mole of the primary condensation product obtained from equimolar amounts of cyanuric chloride and 1-amino-8-naphthol-3,6-disulfonic acid, 1 mole of the primary condensation product obtained from equimolar amounts of cyanuric chloride and 2-amino-5-naphthol-7-sulfonic acid with 1 mole of 1,4-diaminobenzene-2-sulfonic acid | copper | violet |
| 295 | 2 moles of 2-aminophenol-5-β-sulfatoethylsulfone | reaction product of 1 mole of the primary condensation product obtained from equimolar amounts of cyanuric chloride and 1-amino-8-naphthol-3,6-disulfonic acid, 1 mole of the primary condensation product obtained from equimolar amounts of cyanuric chloride and 2-amino-5-napthol- | copper | violet |

TABLE 2-continued

| Example No. | Diazo component | Coupling component | Complex-forming metal | Color shade on cotton |
|---|---|---|---|---|
| | | 7-sulfonic acid with 1 mole of 1,4-diaminobenzene-2-sulfonic acid | | |
| 296 | 2 moles of 2-aminophenol-5-β-sulfatoethylsulfone | reaction product of 1 mole of the primary condensation product obtained from equimolar amounts of cyanuric chloride and 1-amino-8-naphthol-3,6-disulfonic acid, 1 mole of the primary condensation product obtained from equimolar amounts of cyanuric chloride and 2-amino-5-naphthol-7-sulfonic acid with 1 mole of 1,4-diaminobenzene-2-sulfonic acid | chromium | violet-brown |
| 297 | 2 moles of 2-aminophenol-5-β-sulfatoethylsulfone | reaction product of 1 mole of the primary condensation product obtained from equimolar amounts of cyanuric chloride and 1-amino-8-naphthol-3,6-disulfonic acid, 1 mole of the primary condensation product obtained from equimolar amounts of cyanuric chloride and 2-amino-5-naphthol-7-sulfonic acid with 1 mole of 1,4-diaminobenzene-2-sulfonic acid | cobalt | brown-violet |
| 298 | 2 moles of 8-β-sulfatoethylsulfonyl-2-amino-1-naphthol-6-sulfonic acid | reaction product of 1 mole of the primary condensation product obtained from equimolar amounts of cyanuric chloride and 1-amino-8-naphthol-3,6-disulfonic acid, 1 mole of the primary condensation product obtained from equimolar amounts of cyanuric chloride and 2-amino-5-naphthol-7-sulfonic acid with 1 mole of 1,4-diaminobenzene-2-sulfonic acid | copper | reddish-tinged blue |
| 299 | 2 moles of 6-bromo-2-aminophenol-4-β-sulfatoethylsulfone | reaction product of 1 mole of the primary condensation product obtained from equimolar amounts of cyanuric chloride and 1-amino-8-naphthol-3,6-disulfonic acid, 1 mole of the primary condensation product obtained from equimolar amounts of cyanuric chloride and 2-amino-5-naphthol-7-sulfonic acid with 1 mole of 1,4-diaminobenzene-2-sulfonic acid | copper | violet |
| 300 | 2 moles of 6-nitro-2-aminophenol-4-β-sulfatoethylsulfone | reaction product of 1 mole of the primary condensation product obtained from equimolar amounts of cyanuric chloride and 1-amino-8-naphthol-3,6-disulfonic acid, 1 mole of the primary condensation product obtained from equimolar amounts of cyanuric chloride and 2-amino-5-naphthol-7-sulfonic acid with 1 mole of 1,4-diaminobenzene-2-sulfonic acid | cobalt | brown-black |
| 301 | 2 moles of 2-aminophenol-4-β-sulfatoethylsulfone | reaction product of 1 mole of the primary condensation product obtained from equimolar amounts of cyanuric chloride and 1-amino-8-naphthol-3,6-disulfonic acid, 1 mole of the primary condensation product obtained from equimolar amounts of cyanuric chloride and 2-amino-8-naphthol-6-sulfonic acid with 1 mole of 1,3-diaminobenzene-4-sulfonic acid | copper | violet |
| 302 | 2 moles of 2-aminophenol-4-β-sulfatoethylsulfone | reaction product of 1 mole of the primary condensation product obtained from equimolar amounts of cyanuric chloride and 1-amino-8-naphthol-3,6-disulfonic acid, 1 | chromium | grey-violet |

TABLE 2-continued

| Example No. | Diazo component | Coupling component | Complex-forming metal | Color shade on cotton |
|---|---|---|---|---|
| 303 | 2 moles of 2-aminophenol-4-β-sulfatoethylsulfone | mole of the primary condensation product obtained from equimolar amounts of cyanuric chloride and 2-amino-8-naphthol-6-sulfonic acid with 1 mole of 1,3-diamino-benzene-4-sulfonic acid reaction production of 1 mole of the primary condensation product obtained from equimolar amounts of cyanuric chloride and 1-amino-8-naphthol-3,6-disulfonic acid, 1 mole of the primary condensation product obtained from equimolar amounts of cyanuric chloride and 2-amino-8-naphthol-6-sulfonic acid with 1 mole of 1,3-diamino-benzene-4-sulfonic acid | cobalt | brown-violet |
| 304 | 2 moles of 2-aminophenol-5-β-sulfatoethylsulfone | reaction production of 1 mole of the primary condensation product obtained from equimolar amounts of cyanuric chloride and 1-amino-8-naphthol-3,6-disulfonic acid, 1 mole of the primary condensation product obtained from equimolar amounts of cyanuric chloride and 2-amino-8-naphthol-6-sulfonic acid with 1 mole of 1,3-diamino-benzene-4-sulfonic acid | copper | violet |
| 305 | 2 moles of 2-aminophenol-5-β-sulfatoethylsulfone | reaction product of 1 mole of the primary condensation product obtained from equimolar amounts of cyanuric chloride and 1-amino-8-naphthol-3,6-disulfonic acid, 1 mole of the primary condensation product obtained from equimolar amounts of cyanuric chloride and 2-amino-8-naphthol-6-sulfonic acid with 1 mole of 1,3-diamino-benzene-4-sulfonic acid | chromium | grey-violet |
| 306 | 2 moles of 2-aminophenol-5-β-sulfatoethylsulfone | reaction product of 1 mole of the primary condensation product obtained from equimolar amounts of cyanuric chloride and 1-amino-8-naphthol-3,6-disulfonic acid, 1 mole of the primary condensation product obtained from equimolar amounts of cyanuric chloride and 2-amino-8-naphthol-6-sulfonic acid with 1 mole of 1,3-diamino-benzene-4-sulfonic acid | cobalt | opaque violet |
| 307 | 2 moles of 4-methyl-2-aminophenol-5-β-sulfato-ethylsulfone | reaction product of 1 mole of the primary condensation product obtained from equimolar amounts of cyanuric chloride and 1-amino-8-naphthol-3,6-disulfonic acid, 1 mole of the primary condensation product obtained from equimolar amounts of cyanuric chloride and 2-amino-8-naphthol-6-sulfonic acid with 1 mole of 1,3-diamino-benzene-4-sulfonic acid | copper | violet |
| 308 | 2 moles of 2-aminophenol-4-β-sulfatoethylsulfone | reaction product of 2 moles of the primary condensation product obtained from equimolar amounts of cyanuric chloride and 2-amino-5-naphthol-7-sulfonic acid with 1 mole of 1,4-diaminobutane | copper | claret |
| 309 | 2 moles of 2-aminophenol-4-β-sulfatoethylsulfone | reaction product of 2 moles of the primary condensation product obtained from equimolar amounts of cyanuric chloride and 2-amino-5-naphthol-7-sulfonic acid with 1 mole of 1,4-diaminobutane | cobalt | brown |
| 310 | 2 moles of 2-aminophenol-4-β-sulfatoethylsulfone | reaction product of 2 moles of the primary condensation product obtained from equimolar amounts of cyanuric chloride and 2-amino-5-naphthol-7-sulfonic acid with 1 mole of 1,4-diaminobutane | chromium | black |

TABLE 2-continued

| Example No. | Diazo component | Coupling component | Complex-forming metal | Color shade on cotton |
|---|---|---|---|---|
| 311 | 2 moles of 6-nitro-2-amino-phenol-4-β-sulfatoethylsulfone | reaction product of 2 moles of the primary condensation product obtained from equimolar amounts of cyanuric chloride and 2-amino-5-naphthol-7-sulfonic acid with 1 mole of 1,4-diaminobutane | chromium | black |
| 312 | 2 moles of 6-nitro-2-amino-phenol-4-β-sulfatoethylsulfone | reaction product of 2 moles of the primary condensation product obtained from equimolar amounts of cyanuric chloride and 2-amino-5-naphthol-7-sulfonic acid with 1 mole of 1,4-diaminobutane | copper | red-violet |
| 313 | 2 moles of 2-amino-phenol-4-β-sulfatoethylsulfone | reaction product of 2 moles of the primary condensation product obtained from equimolar amounts of cyanuric chloride and 2-amino-5-naphthol-7-sulfonic acid with 1 mole of 1,3-diaminobenzene-4-sulfonic acid | chromium | black-brown |
| 314 | 2 moles of 2-amino-phenol-4-β-sulfatoethylsulfone | reaction product of 2 moles of the primary condensation product obtained from equimolar amounts of cyanuric chloride and 2-amino-5-naphthol-7-sulfonic acid with 1 mole of 1,3-diaminobenzene-4-sulfonic acid | copper | violet |
| 315 | 2 moles of 2-amino-phenol-4-β-sulfatoethylsulfone | reaction product of 2 moles of the primary condensation product obtained from equimolar amounts of cyanuric chloride and 2-amino-5-naphthol-7-sulfonic acid with 1 mole of 1,3-diaminobenzene-4-sulfonic acid | cobalt | brown |
| 316 | 2 moles of 6-nitro-2-amino-phenol-4-β-sulfatoethylsulfone | reaction product of 2 moles of the primary condensation product obtained from equimolar amounts of cyanuric chloride and 2-amino-5-naphthol-7-sulfonic acid with 1 mole of 1,3-diaminobenzene-4-sulfonic acid | chromium | black |
| 317 | 2 moles of 6-nitro-2-amino-phenol-4-β-sulfatoethylsulfone | reaction product of 2 moles of the primary condensation product obtained from equimolar amounts of cyanuric chloride and 2-amino-5-naphthol-7-sulfonic acid with 1 mole of 1,3-diaminobenzene-4-sulfonic acid | copper | red-violet |
| 318 | 2 moles of 2-aminophenol-4-β-sulfatoethylsulfone | reaction product of 2 moles of the primary condensation product obtained from equimolar amounts of cyanuric chloride and 1-amino-5-naphthol-7-sulfonic acid with 1 mole of 1,5-diaminonaphthalene-3-sulfonic acid | copper | red-violet |

What is claimed is:

1. A water soluble dyestuff which in the form of the free acid has the formula (1)

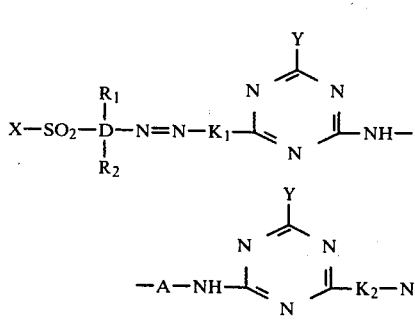

in which $K_1$ and $K_2$ are identical or different to each other and have in the form of the free acid, the formula

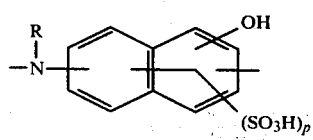

in which R is hydrogen or alkyl and p is 1 or 2, $K_1$ and $K_2$ being bonded via the amino groups to the s-triazine radicals and bonded by the azo groups in ortho-position to their hydroxy groups, D is a benzene nucleus or naphthalene nucleus, $R_1$ is in ortho-position to the azo group and is hydrogen, halogen, lower alkyl, lower alkoxy, hydroxy, carboxy or sulfo and $R_2$ is hydrogen, halogen, lower alkyl, lower alkoxy, nitro or sulfo, $R_1$ and $R_2$ being identical or different from one another; X is β-thiosulfatoethyl, β-chloroethyl, β-sulfatoethyl or vinyl, A is an aliphatic radical of 2–10 C atoms or an aliphatic radical of, in total, 2–6 C atoms, which may be interrupted by a hetero-atom and/or a cycloaliphatic radical, or is a cycloaliphatic radical or is a benzene nucleus or a naphthalene nucleus, these nuclei being unsubstituted or substituted by substituents selected from the group consisting of lower alkyl, lower alkoxy, chlorine, sulfo, carboxy and lower alkanoylamino, or is

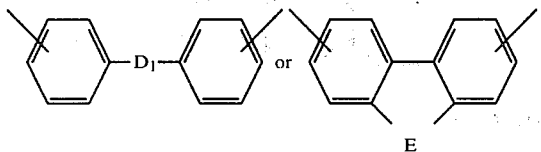

in each of which the benzene nuclei may be substituted by substituents selected from the group consisting of lower alkyl, lower alkoxy, sulfo, carboxy and chlorine, and $D_1$ is a direct covalent bond or a bridge member and E is —O—, —S—, —NH— or —SO$_2$—, Y is chlorine, fluorine, bromine, sulfo or a group of the formula —S—R'— or —O—R", in which R' is a substituent selected from the group consisting of lower alkyl, substituted lower alkyl, phenyl, naphthyl, substituted phenyl, substituted naphthyl or 2-benzthiazolyl and R" is hydrogen or has the meaning of R' with the exception of 2-benzthiazolyl, or Y is an amino group of the formula —NR$_3$R$_4$, in which $R_3$ is hydrogen, an optionally substituted lower aliphatic radical, an optionally substituted araliphatic radical or a cycloaliphatic radical and $R_4$ is hydrogen, an optionally substituted lower aliphatic radical or an optionally substituted aromatic radical or an optionally substituted araliphatic radical or is hydroxy or lower alkoxy or an optionally substituted amino group, or $R_3$ and $R_4$ together with the nitrogen atom form a ring containing lower alkylene and optionally a hetero-atom, and a copper, chromium or cobalt complex dyestuff of the compounds of formula (1) wherein one or both of the $R_1$s are hydroxy.

2. A dyestuff according to claim 1 in which D, $R_1$, $R_2$, $K_1$, $K_2$, A and X are as defined in claim 1 and Y is chlorine, bromine, fluorine, sulfo, amino, methylamino, dimethylamino, β-hydroxyethyl-amino, β-methoxyethyl-amino, β-sulfatoethylamino, β-sulfoethyl-amino, N-methyl-N-β-sulfoethyl-amino, carboxymethyl-amino, N-β-carboxyethyl-amino, N-(carboxyphenyl)-amino, N-(sulfophenyl)-amino, N-(disulfophenyl)-amino, N-(sulfonaphthyl(1))-amino, N-methyl-anilino, morpholino, iso-propoxy, phenoxy or β-hydroxyethylthioether.

3. A dyestuff according to claim 1 with D, $R_1$, $R_2$, $K_1$, $K_2$, A and X as defined in claim 1 and Y is chlorine.

4. A dyestuff according to claim 1, 2 or 3, with Y, $R_1$, $R_2$, $K_1$, $K_2$, A and X as defined in claim 1, 2 or 3 and D is a benzene nucleus.

5. A dyestuff according to claim 1, 2 or 3, with Y, $K_1$, $K_2$, A and X as defined in claim 1, 2 or 3 and D is the naphthalene nucleus bonded in 2-position to the azo, $R_1$ is hydrogen and $R_2$ is sulfo in the 6-position of the naphthalene nucleus, or $R_1$ is sulfo and $R_2$ is hydrogen.

6. A dyestuff according to claim 4, in which —SO$_2$—X is in the meta-position or para-position to the azo group.

7. A dyestuff according to claim 5, with the meanings defined in claim 5, in which D is a naphthalene nucleus bonded in the 2-position to the azo group and —SO$_2$—X is bonded in the 6-position or 8-position.

8. A dyestuff according to claim 1, wherein X is vinyl or β-sulfatoethyl.

9. A dyestuff according to claim 1, in which A is alkylene of 2 to 6 C atoms, optionally being interrupted by 1 or 2 members selected from the group consisting of —NH—, —O—, —N(CH$_3$)—, —S— and cyclohexylene, or is cyclohexylene unsubstituted or substituted by 1–3 methyl, or is a benzene nucleus or a naphthalene nucleus unsubstituted or substituted by substituents selected from the group consisting of lower alkyl, lower alkoxy, chlorine, sulfo, carboxy and lower alkanoylamino, or is

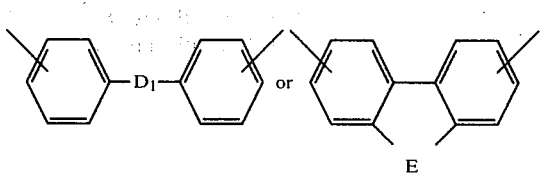

in which each of the benzene nuclei can be substituted by 1 or 2 substituents selected from the group consisting of lower alkyl, lower alkoxy, sulfo, carboxy and chlorine and $D_1$ is a direct covalent bond or —CH$_2$—, —CH$_2$—CH$_2$—, —O—CH$_2$—CH$_2$—O—, —CH=CH—, —NH—, —O—, —S—, —SO$_2$—, —N=N—, —NH—CO—NH—, —CO—NH—, —NH—CO—,

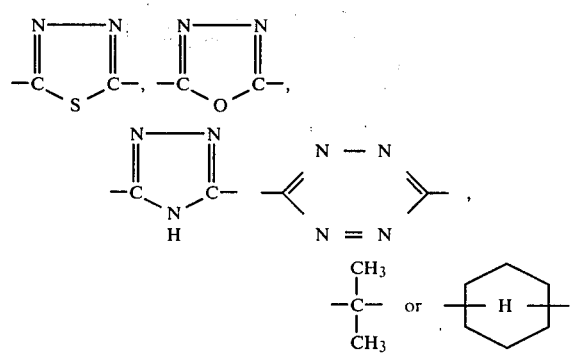

and E is —O—, —S—, —NH— or —SO$_2$—.

10. A dyestuff as claimed in claim 1, wherein $K_1$ and $K_2$ each is the bivalent radical of 1-amino-naphthol-(8)-3,6-disulfonic acid.

11. A dyestuff according to claim 1 in which D, $R_1$, $R_2$, $K_1$ and $K_2$ are as defined in claim 1 and Y is chlorine, X is β-sulfatoethyl and A is

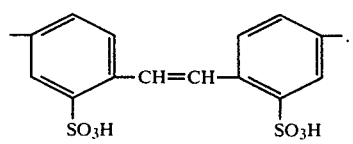

12. A dyestuff according to claim 1 or 9, with D, $R_1$, $R_2$ and A as defined in claim 1 or 9, and X is β-sulfatoethyl, Y is chlorine, $K_1$ is 83
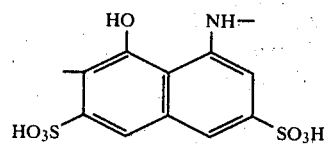
and K₂ is
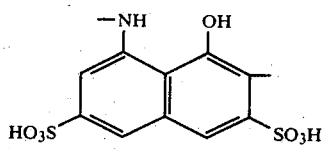
13. A dyestuff according to claim 1 in which D is a benzene nucleus, R₁ and R₂ are each hydrogen, X is β-sulfatoethyl, this β-sulfatoethylsulfonyl being in the p-position to the azo group, Y is chlorine, A is
84
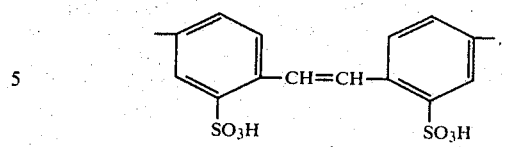
K₁ is
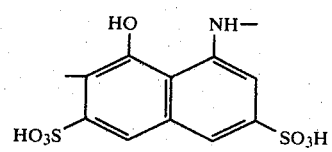
and K₂ is
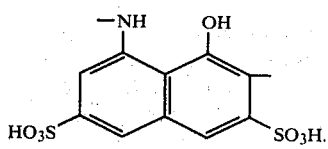
14. A copper, chromium or cobalt complex dyestuff according to claim 1.
15. A dyestuff of the formula
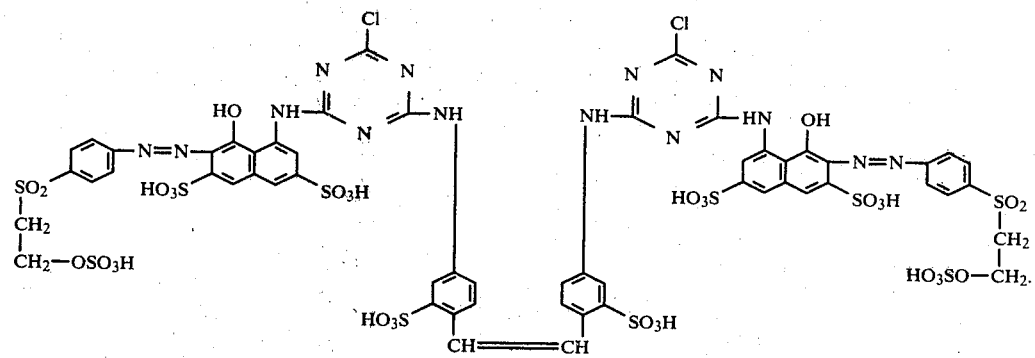
16. A dyestuff of the formula
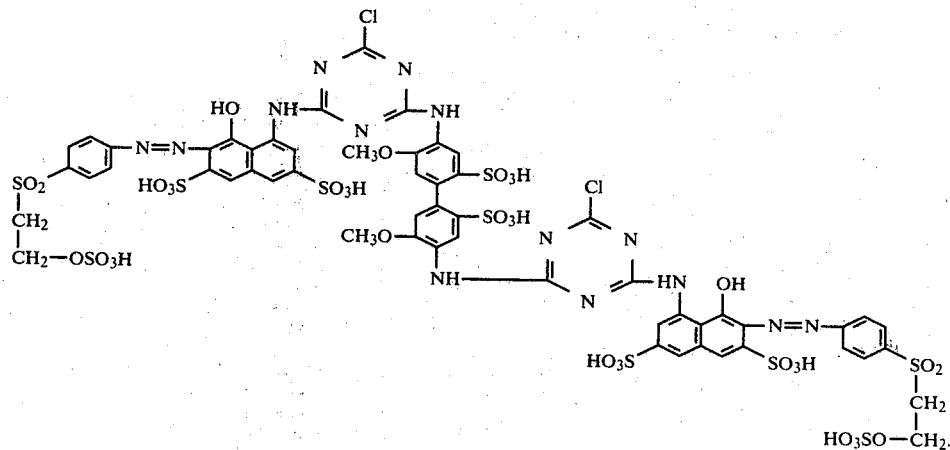
* * * * *